US012659965B2

(12) United States Patent
Bai et al.

(10) Patent No.:  US 12,659,965 B2
(45) Date of Patent:       Jun. 16, 2026

(54) TRANSMISSION CONFIGURATION INDICATOR STATE SELECTION FOR DOWNLINK DATA

(71) Applicant: QUALCOMM Incorporated, San Diego, CA (US)

(72) Inventors: Tianyang Bai, Somerville, NJ (US); Yan Zhou, San Diego, CA (US); Mostafa Khoshnevisan, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 18/047,495

(22) Filed: Oct. 18, 2022

(65) Prior Publication Data

US 2023/0262726 A1      Aug. 17, 2023

Related U.S. Application Data

(60) Provisional application No. 63/267,907, filed on Feb. 11, 2022.

(51) Int. Cl.
*H04W 72/232*        (2023.01)

(52) U.S. Cl.
CPC ................................. *H04W 72/232* (2023.01)

(58) Field of Classification Search
CPC .................................................. H04W 72/232
See application file for complete search history.

(56)                  References Cited

U.S. PATENT DOCUMENTS

2019/0281587 A1*   9/2019   Zhang ................... H04W 72/23
2022/0232403 A1*   7/2022   Lee ........................ H04W 24/08

FOREIGN PATENT DOCUMENTS

WO        WO-2022061544 A1 *   3/2022   ........... H04L 5/0023

OTHER PUBLICATIONS

International Search Report and Written Opinion—PCT/US2023/061846—ISA/EPO—Jul. 26, 2023.
Ad-Hoc Chair (Ericsson): "Session Notes for 8.2 (Supporting NR from 52.6 GHz to 71 Ghz)", 3GPP TSG-RAN WG1 Meeting #106bis-e, Tdoc R1-2110612, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, 13 Pages, Oct. 28, 2021 (Oct. 28, 2021), XP052071777, sections 8.2.1, 8.2.2, 8.2.4-8.2.6.

(Continued)

*Primary Examiner* — Samina F Choudhry
(74) *Attorney, Agent, or Firm* — QUALCOMM Incorporated

(57)                      ABSTRACT

Various aspects of the present disclosure generally relate to wireless communication. In some aspects, a user equipment (UE) may receive downlink control information (DCI). The UE may select a transmission configuration indicator (TCI) state based at least in part on a rule that is associated with how the DCI is received. The UE may receive a physical downlink shared channel communication with the TCI state. Numerous other aspects are described.

30 Claims, 10 Drawing Sheets

(56) References Cited

OTHER PUBLICATIONS

Convida Wireless: "On Beam Management for Supporting NR from 52.6 GHz to 71 GHz", 3GPP TSG-RAN WG1 #104b-e, R1-2103413, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, 4 Pages, Apr. 7, 2021 (Apr. 7, 2021), XP052178151, figures 1, 2, sections 1, 2.1.

ITRI: "Enhancements on Multi-TRP and Multi-Panel Transmission", 3GPP TSG RAN WG1 #99, R1-1912861, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, 5 Pages, Nov. 8, 2019 (Nov. 8, 2019), XP051820213, figures 1-3, table 1, sections 1, 2.1, 2.2.

Lenovo, et al., "Discussion of Multi-TRP/Panel Transmission", 3GPP TSG RAN WG1 Meeting #99, R1-1912316, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, 11 Pages, Nov. 8, 2019 (Nov. 8, 2019), XP051819990, sections 2.1.3, 2.1.4, 3.1.

Partial International Search Report—PCT/US2023/061846—ISA/EPO—Jun. 5, 2023.

* cited by examiner

810 — Transmit DCI

820 — Select a TCI state that is to be used by a UE based at least in part on a rule that is associated with how the DCI is transmitted 830 — Transmit a PDSCH communication in accordance with the TCI state to be used by the UE

800

TRANSMISSION CONFIGURATION INDICATOR STATE SELECTION FOR DOWNLINK DATA

CROSS-REFERENCE TO RELATED APPLICATION

This patent application claims priority to U.S. Provisional Patent Application No. 63/267,907, filed on Feb. 11, 2022, entitled "TRANSMISSION CONFIGURATION INDICA- TOR STATE SELECTION FOR UPLINK DATA," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for selecting a transmission configuration indicator state for a physical downlink shared channel communication.

BACKGROUND

Wireless communication systems are widely deployed to provide various telecommunication services such as tele- phony, video, data, messaging, and broadcasts. Typical wireless communication systems may employ multiple- access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division syn- chronous code division multiple access (TD-SCDMA) sys- tems, and Long Term Evolution (LTE). LTE/LTE-Advanced is a set of enhancements to the Universal Mobile Telecom- munications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to commu- nicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple- output (MIMO) antenna technology, and carrier aggrega- tion. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving downlink control information (DCI). The method may include selecting a transmission configuration indicator (TCI) state based at least in part on a rule that is associated with how the DCI is received. The method may include receiving a physical downlink shared channel (PDSCH) communication with the TCI state.

Some aspects described herein relate to a method of wireless communication performed by a network entity. The method may include transmitting DCI. The method may include selecting a TCI state that is to be used by a UE based at least in part on a rule that is associated with how the DCI is transmitted. The method may include transmitting a PDSCH communication in accordance with the TCI state to be used by the UE.

Some aspects described herein relate to a UE for wireless communication. The UE may include a memory and one or more processors coupled to the memory. The one or more processors may be configured to receive DCI. The one or more processors may be configured to select a TCI state based at least in part on a rule that is associated with how the DCI is received. The one or more processors may be configured to receive a PDSCH communication with the TCI state.

Some aspects described herein relate to a network entity for wireless communication. The network entity may include a memory and one or more processors coupled to the memory. The one or more processors may be configured to transmit DCI. The one or more processors may be config- ured to select a TCI state that is to be used by a UE based at least in part on a rule that is associated with how the DCI is transmitted. The one or more processors may be config- ured to transmit a PDSCH communication in accordance with the TCI state to be used by the UE.

Some aspects described herein relate to a non-transitory computer-readable medium that stores a set of instructions for wireless communication by a UE. The set of instructions, when executed by one or more processors of the UE, may cause the UE to receive DCI. The set of instructions, when executed by one or more processors of the UE, may cause the UE to select a TCI state based at least in part on a rule that is associated with how the DCI is received. The set of instructions, when executed by one or more processors of the UE, may cause the UE to receive a PDSCH communi- cation with the TCI state.

Some aspects described herein relate to a non-transitory computer-readable medium that stores a set of instructions for wireless communication by a network entity. The set of instructions, when executed by one or more processors of the network entity, may cause the network entity to transmit DCI. The set of instructions, when executed by one or more processors of the network entity, may cause the network entity to select a TCI state that is to be used by a UE based at least in part on a rule that is associated with how the DCI is transmitted. The set of instructions, when executed by one or more processors of the network entity, may cause the network entity to transmit a PDSCH communication in accordance with the TCI state to be used by the UE.

Some aspects described herein relate to an apparatus for wireless communication. The apparatus may include means for receiving DCI. The apparatus may include means for selecting a TCI state based at least in part on a rule that is associated with how the DCI is received. The apparatus may include means for receiving a PDSCH communication with the TCI state.

Some aspects described herein relate to an apparatus for wireless communication. The apparatus may include means for transmitting DCI. The apparatus may include means for selecting a TCI state that is to be used by a UE based at least in part on a rule that is associated with how the DCI is transmitted. The apparatus may include means for transmitting a PDSCH communication in accordance with the TCI state to be used by the UE.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
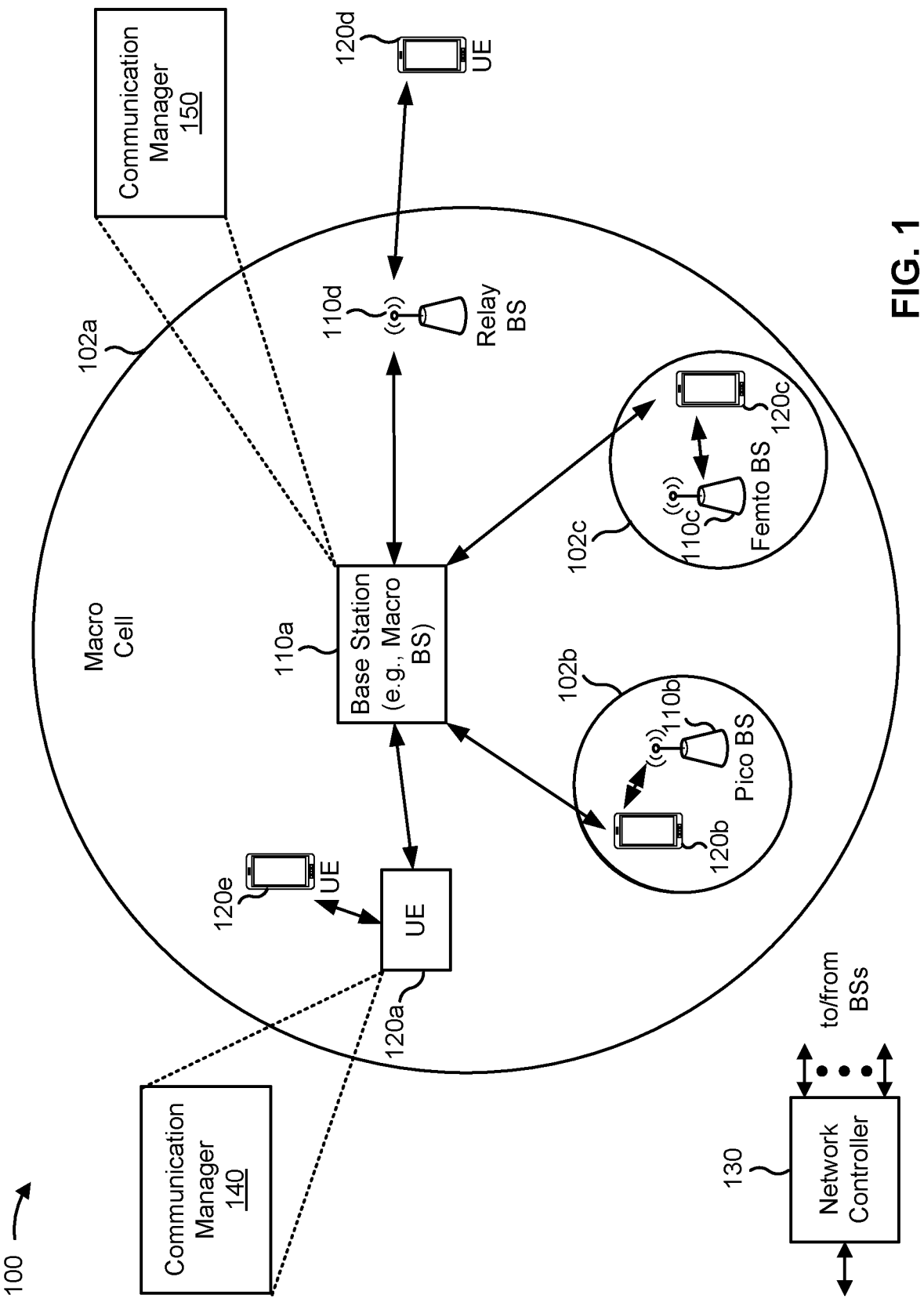
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the terms "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network entity" may refer to one device configured to perform one or more functions, such as those described herein in connection with the base station 110. In some aspects, the terms "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network entity" may refer to any one or more of those different devices. In some aspects, the terms "base station" or "network entity" may refer to one or more virtual base stations and/or one or more virtual base station functions. For example, in some aspects, two or more base station functions may be instantiated on a single device. In some aspects, the terms "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive downlink control information (DCI) and select a transmission configuration indicator (TCI) state based at least in part on a rule that is associated with how the DCI is received. The communication manager 140 may receive a physical downlink shared channel (PDSCH) communication with the TCI state. Additionally, or alternatively, the communication manager 140 may perform one or more other operations described herein.

In some aspects, the network entity may include a communication manager 150. As described in more detail elsewhere herein, the communication manager 150 may transmit DCI and select a TCI state that is to be used by a UE based at least in part on a rule that is associated with how the DCI is transmitted. The communication manager 150 may transmit a PDSCH communication in accordance with the TCI state to be used by the UE. Additionally, or alternatively, the communication manager 150 may perform one or more other operations described herein.

As indicated above, FIG. 1 is provided as an example. Other examples may differ from what is described with regard to FIG. 1.

Figure 2:
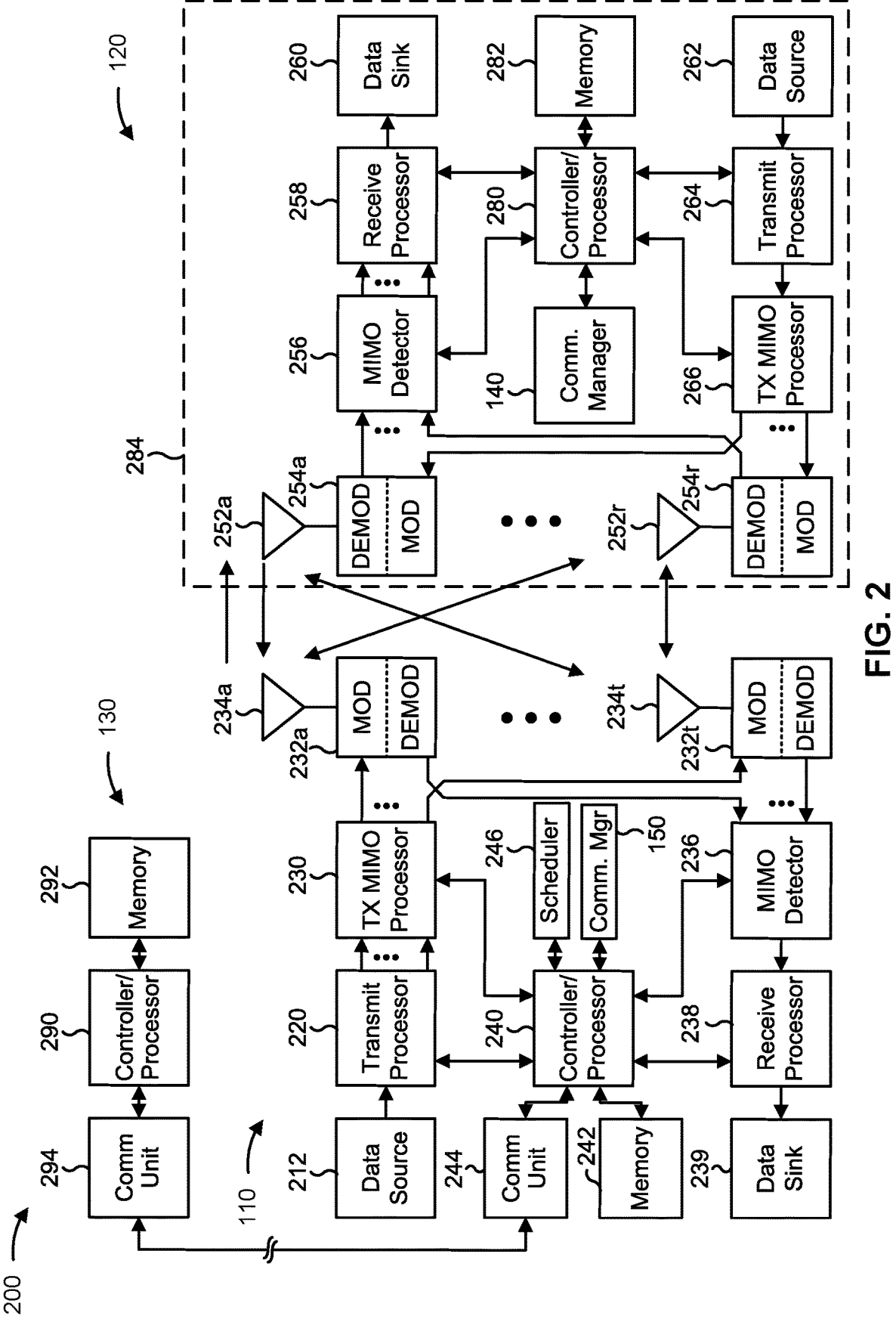
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s)

selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

A controller/processor of a network entity (e.g., the controller/processor 240 of the base station 110), the controller/processor 280 of the UE 120, and/or any other component(s) of FIG. 2 may perform one or more techniques associated with selecting a TCI state for receiving a PDSCH communication, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving DCI; means for selecting a TCI state based at least in part on a rule that is associated with how the DCI is received; and/or means for receiving a PDSCH communication with the TCI state. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for transmitting DCI; means for selecting a TCI state that is to be used by a UE based at least in part on a rule that is associated with how the DCI is transmitted; and/or means for transmitting a PDSCH communication in accordance with the TCI state to be used by the UE. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
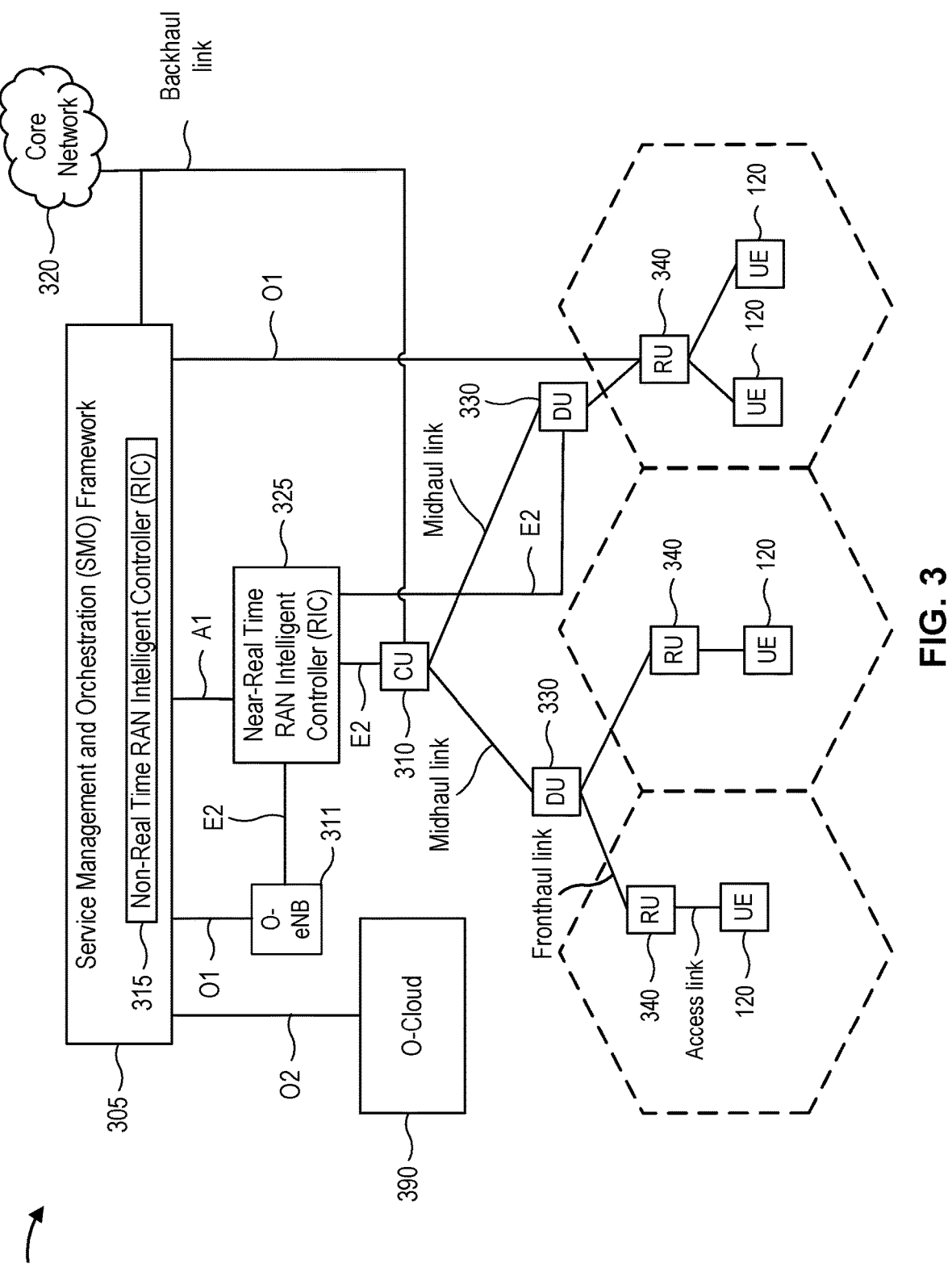
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (TRS), or other components that may provide a network interface for or serve a UE, mobile station, sensor/actuator, or other wireless device.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs

325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
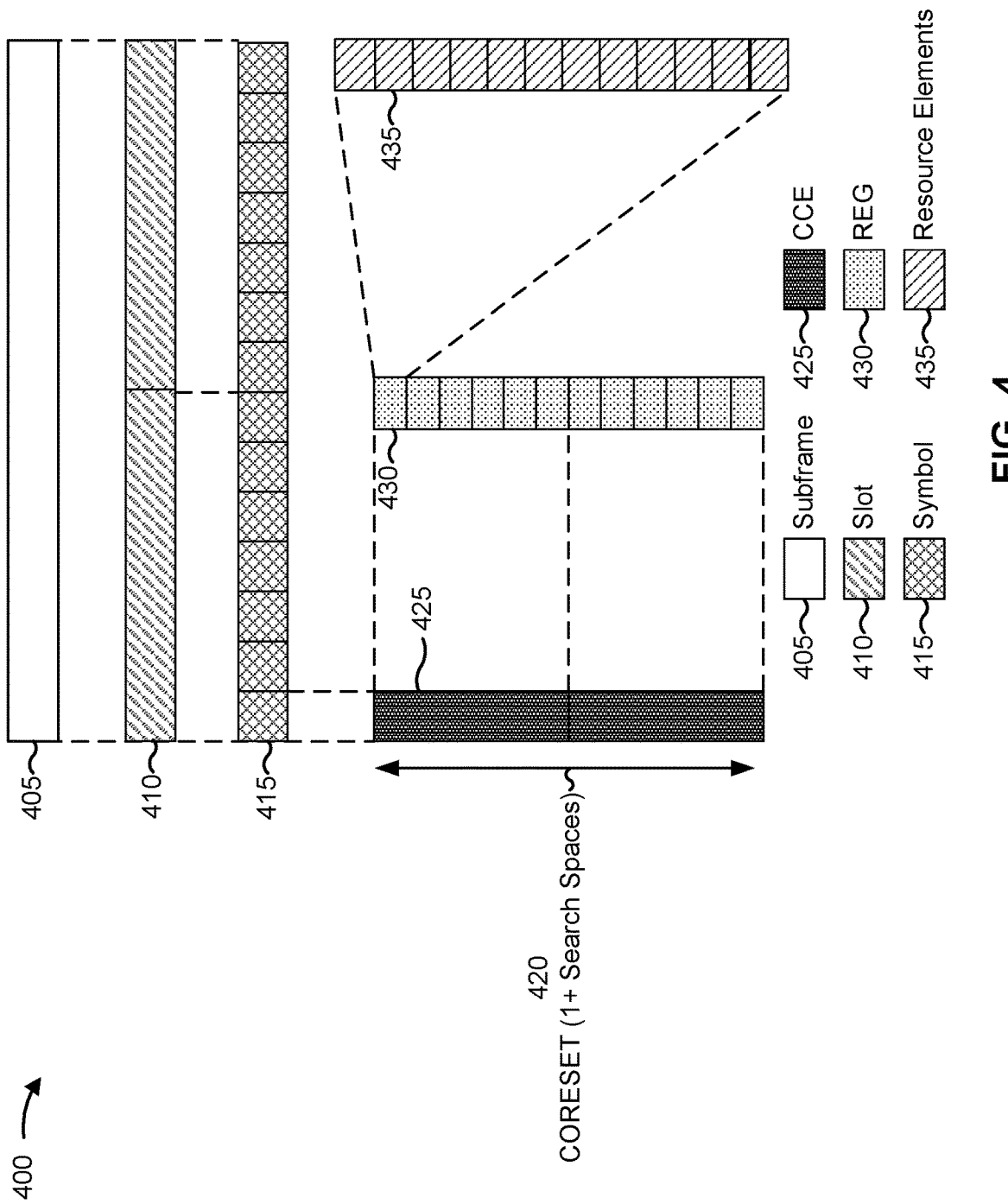
FIG. 4 is a diagram illustrating an example resource structure for wireless communication, in accordance with the present disclosure.

FIG. 4 is a diagram illustrating an example resource structure 400 for wireless communication, in accordance with the present disclosure. Resource structure 400 shows an example of various groups of resources described herein. As shown, resource structure 400 may include a subframe 405. Subframe 405 may include multiple slots 410. While resource structure 400 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 410 may include multiple symbols 415, such as 14 symbols per slot.

The potential control region of a slot 410 may be referred to as a control resource set (CORESET) 420 and may be structured to support an efficient use of resources, such as by flexible configuration or reconfiguration of resources of the CORESET 420 for one or more physical downlink control channels (PDCCHs) and/or one or more PDSCHs. In some aspects, the CORESET 420 may occupy the first symbol 415 of a slot 410, the first two symbols 415 of a slot 410, or the first three symbols 415 of a slot 410. Thus, a CORESET 420 may include multiple resource blocks (RBs) in the frequency domain, and either one, two, or three symbols 415 in the time domain. In 5G, a quantity of resources included in the CORESET 420 may be flexibly configured, such as by using RRC signaling to indicate a frequency domain region (e.g., a quantity of resource blocks) and/or a time domain region (e.g., a quantity of symbols) for the CORESET 420.

As illustrated, a symbol 415 that includes CORESET 420 may include one or more control channel elements (CCEs) 425, shown as two CCEs 425 as an example, that span a portion of the system bandwidth. A CCE 425 may include DCI that is used to provide control information for wireless communication. A base station may transmit DCI during multiple CCEs 425 (as shown), where the quantity of CCEs 425 used for transmission of DCI represents the aggregation level (AL) used by the BS for the transmission of DCI. In FIG. 4, an aggregation level of two is shown as an example, corresponding to two CCEs 425 in a slot 410. In some aspects, different aggregation levels may be used, such as 1, 2, 4, 8, 16, or another aggregation level.

Each CCE 425 may include a fixed quantity of resource element groups (REGs) 430, shown as 6 REGs 430, or may include a variable quantity of REGs 430. In some aspects, the quantity of REGs 430 included in a CCE 425 may be specified by a REG bundle size. A REG 430 may include one resource block, which may include 12 resource elements (REs) 435 within a symbol 415. A resource element 435 may occupy one subcarrier in the frequency domain and one OFDM symbol in the time domain.

A search space may include all possible locations (e.g., in time and/or frequency) where a PDCCH may be located. A CORESET 420 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 420 may be interleaved or non-interleaved. An interleaved CORESET 420 may have CCE-to-REG mapping such that adjacent CCEs are mapped to scattered REG bundles in the frequency domain (e.g., adjacent CCEs are not mapped to consecutive REG bundles of the CORE-SET 420). A non-interleaved CORESET 420 may have a CCE-to-REG mapping such that all CCEs are mapped to consecutive REG bundles (e.g., in the frequency domain) of the CORESET 420.

Figure 5:
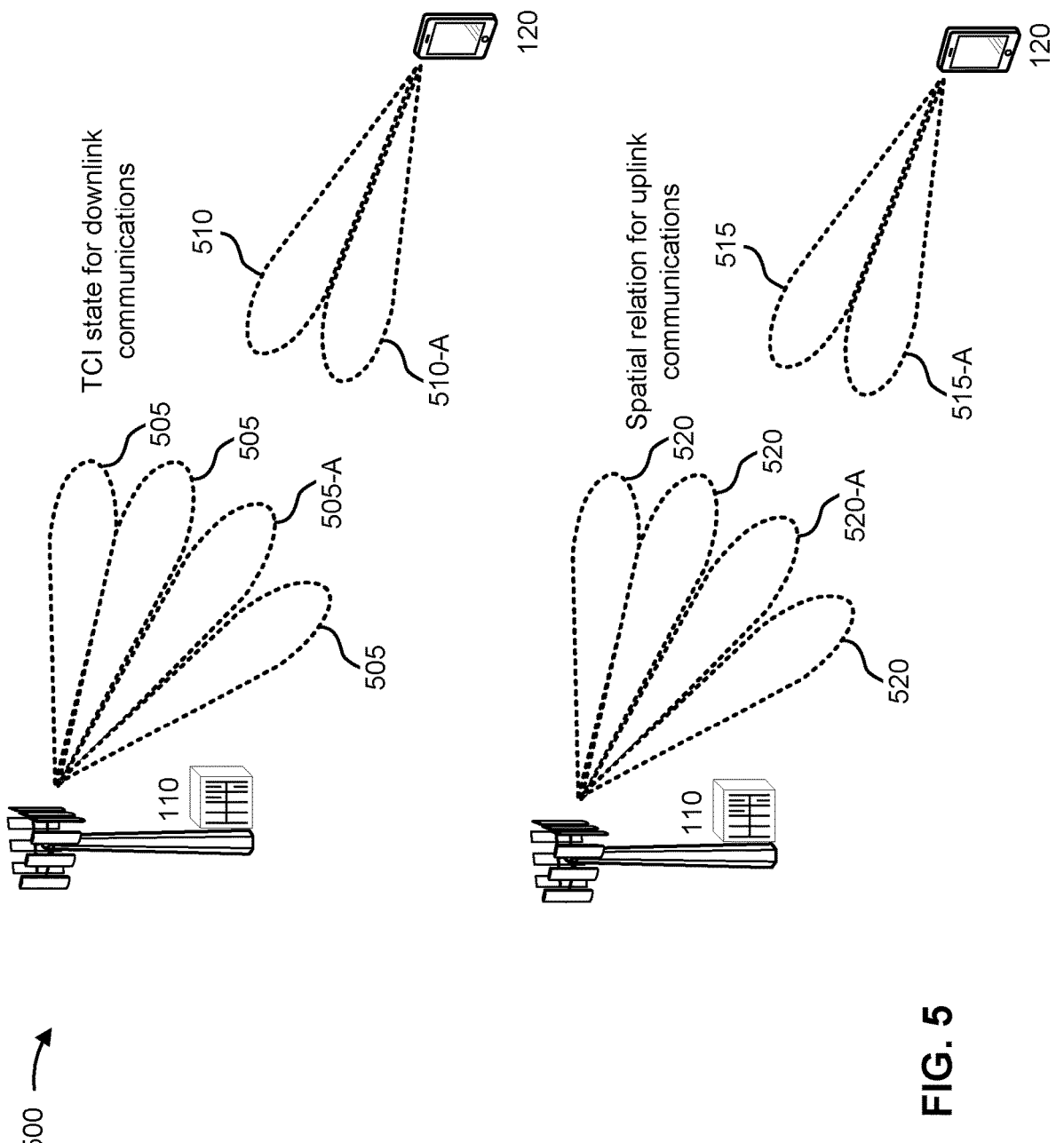
FIG. 5 is a diagram illustrating an example of using beams for communications between a network entity and a UE, in accordance with the present disclosure.

FIG. 5 is a diagram illustrating an example 500 of using beams for communications between a network entity and a UE, in accordance with the present disclosure. As shown in FIG. 5, a network entity (e.g., base station 110) and a UE 120 may communicate with one another.

The base station 110 may transmit to UEs 120 located within a coverage area of the base station 110. The base station 110 and the UE 120 may be configured for beam-formed communications, where the base station 110 may transmit in the direction of the UE 120 using a directional BS transmit beam, and the UE 120 may receive the transmission using a directional UE receive beam. Each BS transmit beam may have an associated beam identifier (ID), beam direction, or beam symbols, among other examples. The base station 110 may transmit downlink communications via one or more BS transmit beams 505.

The UE 120 may attempt to receive downlink transmissions via one or more UE receive beams 510, which may be configured using different beamforming parameters at receive circuitry of the UE 120. The UE 120 may identify a particular BS transmit beam 505, shown as BS transmit beam 505-A, and a particular UE receive beam 510, shown as UE receive beam 510-A, that provide relatively favorable performance (for example, that have a best channel quality of the different measured combinations of BS transmit beams 505 and UE receive beams 510). In some examples, the UE 120 may transmit an indication of which BS transmit beam 505 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 505-A and the UE receive beam 510-A), which may be further refined and maintained in accordance with one or more established beam refinement procedures.

A downlink beam, such as a BS transmit beam 505 or a UE receive beam 510, may be associated with a TCI state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 505 may be associated with a synchronization signal block (SSB), and the UE 120 may indicate a preferred BS transmit beam 505 by transmitting uplink transmissions in resources of the SSB that are associated with the preferred BS transmit beam 505. A particular SSB may have an associated TCI state (for example, for an antenna port or for beamforming). The base station 110 may, in some examples, indicate a downlink BS transmit beam 505 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 510 at the UE 120. Thus, the UE 120 may select a corresponding UE receive beam 510 from a set of BPLs based at least in part on the base station 110 indicating a BS transmit beam 505 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a CORESET. The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as an RRC message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 515.

The base station 110 may receive uplink transmissions via one or more BS receive beams 520. The base station 110 may identify a particular UE transmit beam 515, shown as UE transmit beam 515-A, and a particular BS receive beam 520, shown as BS receive beam 520-A, that provide relatively favorable performance (for example, that have a best channel quality of the different measured combinations of UE transmit beams 515 and BS receive beams 520). In some examples, the base station 110 may transmit an indication of which UE transmit beam 515 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 515-A and the BS receive beam 520-A), which may be further refined and maintained in accordance with one or more established beam refinement procedures. An uplink beam, such as a UE transmit beam 515 or a BS receive beam 520, may be associated with a spatial relation. A spatial relation may indicate a directionality or a characteristic of the uplink beam, similar to one or more QCL properties, as described above.

3GPP standards Release 17 is establishing a unified TCI state framework in which a TCI state may be used to indicate more than one beam. The TCI state may be used to indicate beams for a downlink channel or RS and/or an uplink channel or RS. There may be multiple types of unified TCI states. For example, a joint downlink/uplink common TCI state may indicate a common beam for at least one downlink channel or RS and at least one uplink channel or RS. A separate downlink common TCI state may indicate a common beam for more than one downlink channel or RS. A separate uplink common TCI state may indicate a common beam for more than one uplink channel or RS. Other types of unified TCI states may include a separate downlink single channel or RS TCI state that indicates a beam for a single downlink channel or RS, a separate uplink single channel or RS TCI state that indicates a beam for a single uplink channel or RS, or an uplink spatial relation information, such as a spatial relation indicator (SRI), that indicates a beam for a single uplink channel or RS.

Each channel or RS is to have a beam indicated with a TCI state or a spatial relation associated with a TCI state after an RRC connection. A network entity may indicate a beam (TCI state) to a UE, or the UE may indicate a beam to the network entity. Release 17 beam indications may be used for intra-cell beam management and for inter-cell beam management. In a unified TCI framework for intra-cell beam management, a downlink RS may share a TCI state with another downlink RS or downlink channel. The downlink channel may be a PDSCH or a PDCCH for UE-dedicated (UE-specific) communication (e.g., transmission, reception). UE-dedicated reception on the PDCCH may be on all or a subset of CORESETs in a component carrier (CC). A network entity may transmit a MAC control element (CE) or DCI to activate a unified TCI state. Some unified TCI state scenarios may involve uplink channels or uplink RSs. An uplink RS may share a TCI state with UE-dedicated communication on a physical uplink shared channel (PUSCH) or a physical uplink control channel (PUCCH).

A beam indication may be one of at least two types. An individual beam indication for a single target channel or RS may be referred to as a "single-target beam indication." This type of beam indication may correspond to the legacy downlink TCI state and spatial relation information in 3GPP standards Release 15 and Release 16, which may be associated with a single target channel or RS for each beam indication. Another type of beam indication may be a simultaneous beam indication for multiple target channels or RSs, referred to as a "multi-target beam indication." This type of beam indication may correspond to the unified TCI framework introduced in Release 17, which may be indicated to multiple target channels or RSs for each beam indication.

Release 17 beam indications may include MAC CE-based signaling or DCI-based signaling (e.g., DCI format 1_1, DCI format 1_2). For example, a network entity may transmit a scheduling or activating DCI with a TCI state indicated in a TCI field of the DCI. The UE may use this TCI state for reception of a PDSCH communication. In addition, a network entity may transmit a DCI (e.g., an earlier DCI separate from a scheduling or activating DCI) that indicates an indicated TCI state used for UE-dedicated reception. The UE is to use this indicated TCI state unless the UE received a scheduling or activation DCI with a TCI state indicated in a TCI field of the DCI. That is, the indicated TCI state used for UE-dedicated reception may be a default TCI state used for UE-dedicated reception if a scheduling or activating DCI does not provide a TCI state.

For a unified TCI framework, there may be different types of CORESETs associated with different types of search spaces when applying an indicated TCI state to PDCCH reception and the respective PDSCH reception: "CORESET A" may refer to a CORESET other than CORESET #0 that is associated with only UE-dedicated reception on the PDCCH in a CC (this may include CORESETs associated with UE-dedicated SS (USS) and/or common SS (CSS) Type 3); "CORESET B" may refer to a CORESET other than CORESET #0 that is associated with only non-UE-dedicated reception on the PDCCH in a CC (this may include CORESETs associated with CSS or CSS other than Type 3); "CORESET C" may refer to a CORESET other than CORESET #0 that is associated with both UE-dedicated and non-UE-dedicated reception on the PDCCH in a CC; and CORESET #0 is a special CORESET that is associated with SS #0, which is a common SS used for scheduling system information block 1 (SIB1), such as during an initial access process.

CSS types may include Type 0, Type 0A, Type 0B, Type 1, Type1A, Type 2, Type 2A, and Type 3. CSS Type 0 is used for a system information block 1 (SIB1) with a system information (SI) radio network temporary identifier (RNTI) (SI-RNTI), a multicast control channel RNTI (MCCH-RNTI), or a group RNTI (G-RNTI) on a primary cell (PCell). CSS Type 0A is used for open systems interconnection (OSI) with an SI-RNTI on a PCell. CSS Type 0B is used for broadcast and multicast with an MCCH-RNTI or a G-RNTI. CSS Type 1 is used for a random access channel (RACH) process with a random access RNTI (RA-RNTI) or a temporary cell RNTI (TC-RNTI). CSS Type 1A is used for PUSCH communications in an RRC inactive state with a cell RNTI (C-RNTI) or a configured scheduling RNTI (CS-RNTI) in a PCell. CSS Type 2 is used for paging with a paging RNTI (P-RNTI) on a PCell. CSS Type 2A is used for a paging early indication (PEI) with a (PeiRNTI) on a PCell. CSS Type 3 is used for UE group-based common operations with an interruption RNTI (INT-RNTI), a slot format identification RNTI (SFI-RNTI), a transmit power control (TPC) RNTI for PUSCH (TPC-PUSCH-RNTI), a TPC-PUCCH-RNTI, a TPC for sounding reference signal (SRS) RNTI (TPC-SRS-RNTI), or a cancellation indication RNTI (CI-RNTI). CSS Type 3 may also use, on a PCell only, a C-RNTI, an MCS-C-RNTI, CS-RNTI(s), or may be configured by SearchSpace-Multicast in PDCCH-Config-Multicast for DCI formats with a cyclic redundancy check (CRC) scrambled by a G-RNTI, or a G-CS-RNTI.

CSS types may be include different DCI formats. For example, CSS Type 0 through CSS Type 2 may involve a DCI 0_0 or a DCI 0_1. CSS Type 2A may involve a DCI 2_7. CSS Type 3 may involve DCI 2_0, DCI 2_1, DCI 2_2, DCI 2_3, DCI 2_4, DCI 2_6, DCI 4_0, DCI 4_1, or DCI 4_2. For CSS Type 0, CSS Type 0A, CSS Type 1, and CSS Type 2, the UE monitors PDCCH candidates for DCI format 0_0 and DCI format 1_0 with CRC scrambled by the C-RNTI, the MCS-C-RNTI, or the CS-RNTI in the one or more search space sets in a slot where the UE monitors PDCCH candidates for at least a DCI format 0_0 or a DCI format 1_0 with CRC scrambled by an SI-RNTI, an RA-RNTI or a P-RNTI.

A USS may be UE-specific or a standard CG (std-CG) and use a C-RNTI, an MCS-C-RNTI, a semi-persistent CSI RNTI (SP-CSI-RNTI), a CS-RNTI(s), an NR sidelink RNTI (SL-RNTI), an SL-CS-RNTI, or an LTE sidelink CS-RNTI (SL-L-CS-RNTI), an SL semi-persistent scheduling (SPS) vehicle RNTI (V-RNTI), or configured by sdt-CG-SearchSpace for DCI formats with a CRC scrambled by a C-RNTI or a CS-RNTI. A USS may involve DCI 0_x, DCI 1_x, or DCI 3_x.

There may be several options for categorizing SS types as UE-dedicated or non-UE-dedicated. For option 1, UE-dedicated SS types may include USS, and non-UE-dedicated types may include all CSS types. For option 2, UE-dedicated SS types may include USS and CSS Type 3, and non-UE-dedicated SS types may include all CSS types except CSS Type 3. For option 3, UE-dedicated SS types may include, USS, CSS Type 3, and CSS Type 2, and non-UE-dedicated SS types may include all CSS types except CSS Type 2 and CSS Type 3.

The indicated downlink or joint TCI state may be used for UE-dedicated PDSCH and UE-dedicated CORESET reception. The indication of a TCI state may be via DCI format 1_1 or 1_2. For non-UE-dedicated PDSCH and non-UE-dedicated CORESET reception, whether to follow the indicated TCI state is configured in RRC. If configured as "not following the indicated TCI state," legacy signaling may be used to update the TCI state. For a CORESET, the legacy method may be to use a MAC CE to update TCI state.

For the unified TCI state indication, support per CORESET may be determined as follows. For any PDCCH reception on a "CORESET A" and the respective PDSCH reception, the UE always applies the indicated TCI state. For any PDCCH reception on a "CORESET B" and the respective PDSCH reception, whether or not the UE applies the indicated TCI state associated with the serving cell is determined per CORESET by RRC.

There may be several PDCCH beam selection rules for CORESETs of type CORESET C. One rule is to specify, per CORESET determination, where CORESET C follows CORESET A behavior or CORESET B behavior. Another rule is to specify CORESET C behavior per monitoring occasion (MO) determination. For example, assume a first search space (SS1) and a second search space (SS2) are both associated with CORESET1, SS1 is monitored in every slot, and SS2 is monitored in every 2 slots. This rule specifies that different beams may be selected in different MOs of a CORESET, based on which SSs are monitored in the MO (e.g., whether SS1 or both SS1 and SS2). With regard to per MO determination, in an MO, if all the SSs to monitor are from UE-dedicated SSs and non-UE-dedicated SSs configured to follow the indicated TCI state, then the UE uses the indicated TCI state for UE-dedicated PDCCH and PDSCH reception. In an MO, if all the SSs to monitor are from non-UE-dedicated SSs configured not to follow the indicated TCI state, then the UE uses the dedicated TCI state indicated for the CORESET for non-UE-dedicated PDCCH reception. In a MO, if the UE needs to monitor at least a SS from UE-dedicated SSs and non-UE-dedicated SSs configured to follow the indicated TCI state, and at least an SS from non-UE-dedicated SSs configured not to follow the indicated TCI state, the UE may follow one of three alternatives. In a first alternative, the UE always uses the indicated TCI state shared by UE-dedicated PDSCH and PDCCH. In a second alternative, the UE always uses the dedicated TCI state indicated for the CORESET for non-UE-dedicated PDSCH reception. In a third alternative, the TCI state that the UE uses depends on the MO configurations. For example, the UE uses the TCI state determined by the type of the SS of the lowest SS ID from the lowest ID CC in the MO.

There may be several PDCCH beam selection rules for CORESET #0. For instance, the TCI state of CORESET #0 may be specified as quasi-collocated (QCLed) with the SSB that the UE uses obtain a master information block (MIB). Additionally or alternatively, the TCI state of CORESET #0 may be configured by a MAC CE, after the TCI state pool is configured at the UE via RRC messages. Additionally, a USS may be associated with CORESET #0. In such a scenario, the TCI state of CORESET #0 may be determined based at least in part on a beam selection rule similar to that defined for type CORESET C.

However, the current TCI state rules for 3GPP Release 15 and 16 do not account for the scheduling CORESET type, such as whether the scheduling CORESET belongs to a UE-dedicated PDCCH reception. In Release 17, different rules may be applied to UE-dedicated PDSCH and non-UE-dedicated PDSCH. Whether a PDSCH communication is UE-dedicated or not may depend on the beam selection (TCI state) in a TCI field of a scheduling DCI received on the PDCCH or whether the scheduling DCI and CORESET are considered to be UE-dedicated. It has not been specified how to determine whether a PDSCH is UE-dedicated or non-UE-dedicated or how to select a TCI state for UE-dedicated and non-UE-dedicated PDSCH reception, including for both dynamic grant PDSCH reception and SPS PDSCH reception. Without rules specifying TCI state selection for PDSCH reception, beam selection may be suboptimal, and communications may degrade and waste processing resources and signaling resources.

As indicated above, FIG. 5 is provided as an example. Other examples may differ from what is described with respect to FIG. 5.

Figure 6:
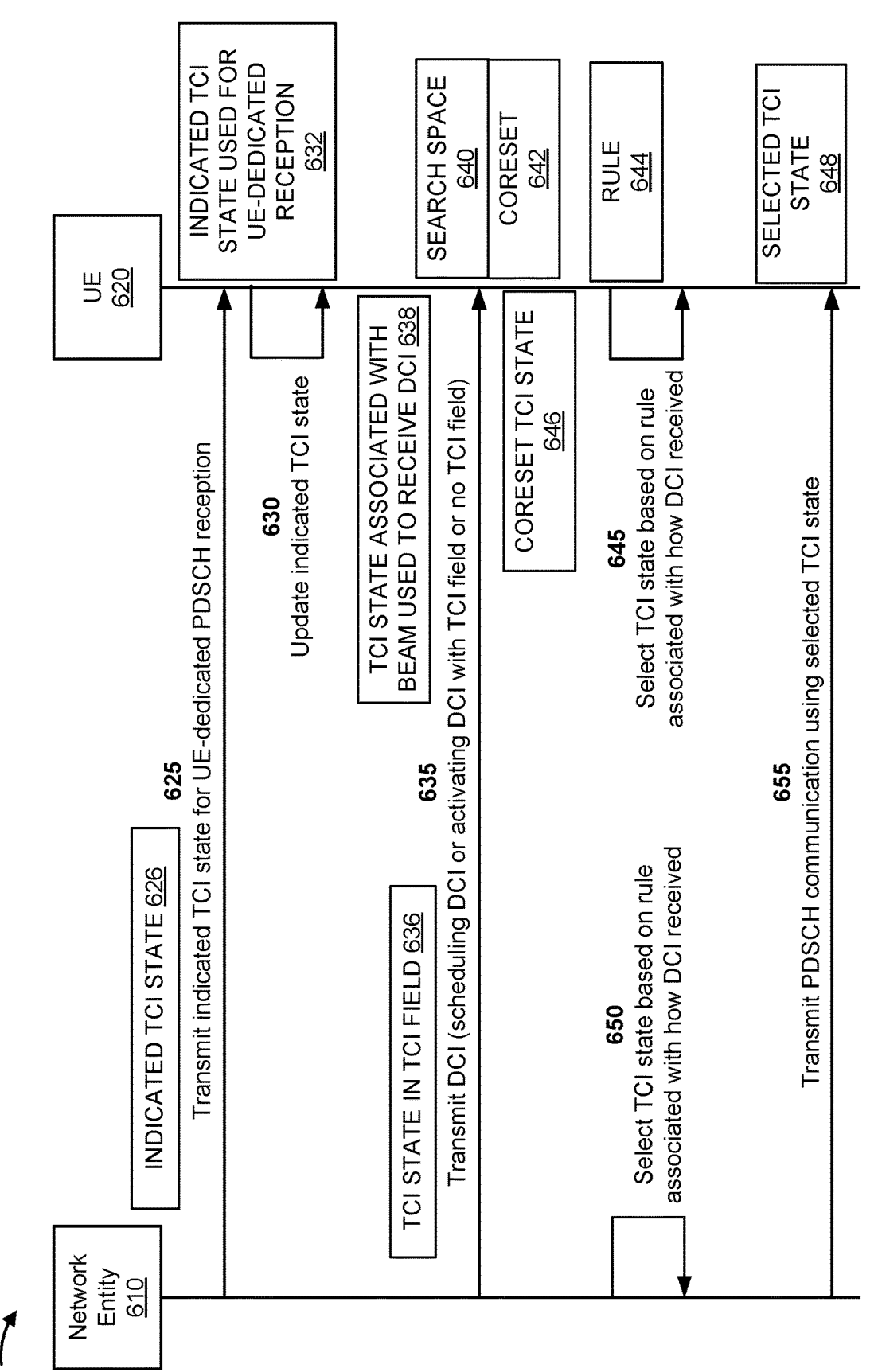
FIG. 6 is a diagram illustrating an example associated with selecting a transmission configuration indicator state for receiving a physical downlink shared channel communication, in accordance with the present disclosure.

FIG. 6 is a diagram illustrating an example 600 associated with selecting a TCI state for receiving a PDSCH communication, in accordance with the present disclosure. As shown in FIG. 6, a network entity 610 (e.g., base station 110) and a UE 620 (e.g., UE 120) may communicate with one another.

According to various aspects described herein, the UE 620 may be configured with one or more rules (e.g., via the network entity 610 or stored configuration information according to a standard) that specify how to select a TCI state for UE-dedicated or non-UE-dedicated reception of PDSCH communications. This may include determining whether the PDSCH communication is UE-dedicated or non-UE-dedicated.

As shown by reference number 625, the network entity 610 may transmit an indicated TCI state 626 that the UE is to use for UE-dedicated PDSCH reception. The network entity 610 may transmit the indicated TCI state 626 in a MAC CE or a DCI with DCI format 1_1 or 1_2. As shown by reference number 630, the UE 620 may use the indicated TCI state 626 to update an indicated TCI state used for UE-dedicated reception 632. The indicated TCI state used for UE-dedicated reception 632 is stored at the UE 620 as a default TCI state to use for PDSCH reception.

As shown by reference number 635, the network entity 610 may transmit a DCI to the UE 620. The DCI may be a scheduling DCI that schedules a dynamic grant PDSCH communication or an activation DCI that activates an SPS PDSCH communication. The DCI may include a TCI field or not include a TCI field. If the DCI has a TCI field, the TCI field may indicate a TCI state 636 that the UE 620 is to use for the PDSCH communication. Note that this TCI state 636 is separate from the indicated TCI state used for UE-dedicated reception 632. The network entity 610 may transmit the indicated TCI state 626 (of reference number 625) before the DCI (of reference number 635) or after the DCI (of reference number 635). The DCI may be received in a beam that is associated with a TCI state 638. The DCI may be received in a search space 640 and in a CORESET 642.

The UE 620 may be configured with a rule 644, among other rules, that specifies which TCI state the UE 620 is to select based at least in part on how the DCI is received. How the DCI is received may include whether the DCI includes a TCI field, whether the DCI is received in a particular search space, whether the DCI is received in a particular CORESET, whether the TCI field shares the same TCI state as the indicated TCI state used for UE-dedicated reception 632, and/or other characteristics of how the DCI is received.

As shown by reference number 645, the UE 620 may select a TCI state based at least in part on the rule 644 that is associated with how the DCI is received. In some aspects, selecting the TCI state may include determining whether the PDSCH communication is UE-dedicated or non-UE-dedicated based at least in part on the rule 644, and selecting the TCI state based at least in part on whether the PDSCH communication is UE-dedicated or non-UE-dedicated. By using specified rules for TCI state selection for PDSCH reception, the UE 620 may have more successful PDSCH reception under different scenarios.

One such scenario may involve a scheduling offset. The DCI may have a scheduling offset between a last symbol of the received DCI (scheduled PDCCH communication) and when the PDSCH communication is to be transmitted. This scheduling offset may be compared to a threshold, such as a time duration for switching to a selected TCI state (e.g., timeDurationforQCL). If the scheduling offset does not satisfy the threshold (e.g., is smaller than the threshold), the UE 620 may use a default beam (default TCI state) as defined in Release 16. That is, if the UE 620 does not have time to switch to the TCI state 636 indicated in the TCI field in DCI, the UE 620 may use the default TCI state. The default TCI state for the PDSCH communication may be the indicated TCI state used for UE-dedicated reception 632.

The scheduling offset may satisfy the threshold (e.g., scheduling offset is no smaller than the threshold). Some rules may apply to this scenario, where the TCI state is selected by SS type. For example, the rule 644 may specify that if the scheduling offset (from a last symbol of the DCI to a scheduled reception of the PDSCH communication) satisfies the threshold, the PDSCH communication is UE-dedicated if the DCI is received in a UE-dedicated search space (e.g., USS). The UE 620 may then select to use the indicated TCI state used for UE-dedicated reception 632 to receive the PDSCH communication. The rule 644 may specify that if the scheduling offset satisfies the threshold, the PDSCH communication is non-UE-dedicated if the DCI is received in a non-UE-dedicated search space (e.g., CSS). The UE 620 may then select to use the TCI state 638 that is associated with the beam used for receiving the DCI if the DCI has no TCI field. If the DCI has a TCI field, the UE 620 may select the indicated TCI state used for UE-dedicated reception 632. The rule 644 may make an exception for if the scheduling offset satisfies the threshold, the PDSCH communication is UE-dedicated if the DCI is received in a non-UE-dedicated search space and if the DCI is scrambled by a C-RNTI, an MCS-RNTI, or a CG-RNTI. The UE 620 may select the indicated TCI state used for UE-dedicated reception 632.

In some aspects, the rule 644 may involve whether a PDSCH communication is to share a TCI state (e.g., indicated TCI state used for UE-dedicated reception 632) that follows the same behavior or TCI state as the CORESET 642 in which the DCI is received. That is, the CORESET 642 may share the same TCI state as the indicated TCI state used for UE-dedicated reception 632. For example, in some aspects, the rule 644 may specify that if the scheduling offset satisfies the threshold, the UE 620 is to select the indicated TCI state used for UE-dedicated reception 632 if the indicated TCI state used for UE-dedicated reception 632 and a TCI state 646 of the CORESET 642 that includes the DCI are the same. The DCI format may be in DCI format DCI 1_1 or DCI 1_2, which includes a TCI field for unified TCI indications. The UE 620 may update the indicated TCI state used for UE-dedicated reception 632 after an application time if a format of the DCI is DCI 1_1 or DCI 1_2 or ignore the TCI field in the DCI if a format of the DCI is DCI 4_2. Ignoring the TCI field may involve using a different TCI state than the TCI state 636 in the TCI field. This may include using the indicated TCI state used for UE-dedicated reception 632. In some aspects, the rule 644 may specify that if the scheduling offset satisfies the threshold, the UE 620 may select the TCI state 638 of the beam used for receiving the DCI if the DCI has no TCI field (or no TCI field used for unified TCI indications).

In some aspects, the rule 644 may involve whether a PDSCH communication is to share TCI state (e.g., indicated TCI state used for UE-dedicated reception 632) that follows a different behavior (e.g., TCI state) as the CORESET 642. That is, the CORESET 642 does not share the same TCI state as the indicated TCI state used for UE-dedicated reception 632. For example, the rule 644 may specify that if the scheduling offset satisfies the threshold, if the indicated TCI state used for UE-dedicated reception 632 and a TCI state 646 of the CORESET 642 that includes the DCI are different, and if the DCI has a TCI field that is used for UE-dedicated TCI indications, the UE 620 is to ignore the TCI field. The rule 644 may specify that if the scheduling offset satisfies the threshold, if an indicated TCI state used for UE-dedicated reception 632 and the TCI state 646 of the CORESET 642 are different, and if the DCI has a TCI field that is used for UE-dedicated TCI indications (e.g., DCI 1_1, DCI 1_2), the UE 620 is to select the TCI state 636 indicated by the TCI field in the DCI.

In some aspects, the rule 644 may specify that if the scheduling offset satisfies the threshold, if the indicated TCI state used for UE-dedicated reception 632 and the TCI state 646 of the CORESET 642 are different, and if the DCI has a TCI field that is used for UE-dedicated TCI indications, the UE 620 is to select a TCI state 638 of the beam used to receive the DCI in order to receive the PDSCH communication. The scheduled PDSCH may follow the scheduling PDCCH beam. The UE 620 may update the indicated TCI state used for UE-dedicated reception 632 based on the TCI field in the DCI. For example, similar to reference number 630, the UE 620 may replace the current indicated TCI state used for UE-dedicated reception 632 with the TCI state 636 in the TCI field.

In some aspects, the rule 644 may specify that if the scheduling offset satisfies the threshold, if the indicated TCI state used for UE-dedicated reception 632 and the TCI state 646 of the CORESET 642 are different, and if the DCI has a TCI field that is not used for UE-dedicated TCI indications (e.g., UE-dedicated PDSCH/PDCCH TCI indication, DCI format 4-2), the UE is to select the TCI state 636 indicated by the TCI field in the DCI.

In some aspects, the PDSCH communication may be an SPS PDSCH communication that is activated with an activation DCI. The network entity 610 may transmit a DCI with format DCI 1_0, DCI 1_1, or DCI 1_2, scrambled with a CS-RNTI. The new data indicator (NDI) field may be set to "0", and other fields may contain validation sequences to activate the SPS PDSCH. The other fields may include a hybrid automatic repeat request (HARQ) process number field set to all zeros or an RV field set to all zeros. The HARQ process number field may indicate which SPS configuration that the network entity 610 wants to activate. Accordingly, the rule 644 may specify that if the DCI is an activation DCI of an SPS PDSCH communication and if the DCI is received in a UE-dedicated search space (e.g., USS), the UE 620 is to select the indicated TCI state used for UE-dedicated reception 632. The rule 644 may specify that if the DCI is an activation DCI of an SPS PDSCH communication and if the DCI is not received in a USS (e.g., received in a CSS), the UE 620 is to select the TCI state 638 of the beam used to receive the DCI.

In some aspects, the rule 644 may specify that if the DCI is an activation DCI of an SPS PDSCH communication and if the DCI is received in a non-UE-dedicated search space (e.g., CSS), the UE 620 is to select the indicated TCI state used for UE-dedicated reception 632. The DCI may be scrambled with a CG-RNTI.

In some aspects, the rule 644 may specify that if the DCI is an activation DCI of an SPS PDSCH communication and if the DCI is received in a CORESET associated with the indicated TCI state used for UE-dedicated reception 632, the UE 620 is to select the indicated TCI state used for UE-dedicated reception 632 to receive the SPS PDSCH communication. The rule 644 may specify that if the DCI is an activation DCI of an SPS PDSCH communication, if the DCI is received in a CORESET 642 associated with a TCI state 646 that is different than the TCI state for UE-dedicated reception 632, and if the DCI does not include a TCI field, the UE is to select the TCI state 646 associated with the CORESET 642 for reception of the SPS PDSCH communication.

There may be several options if the scheduling/activation DCI has a TCI field and if the TCI field is used for UE-dedicated PDSCH/PDCCH TCI indications (e.g., in DCI 1_1 or DCI 1_2). In some aspects, the rule 644 may specify that if the DCI is an activation DCI of an SPS PDSCH communication, if the DCI is received in a CORESET 642 associated with a TCI state 646 that is different than the indicated TCI state used for UE-dedicated reception 632, and if the DCI includes a TCI field, the UE 620 is to ignore the TCI field. The rule 644 may specify that if the DCI is an activation DCI of an SPS PDSCH communication, if the DCI is received in a CORESET 642 associated with a TCI state 646 that is different than the indicated TCI state used for UE-dedicated reception 632, and if the DCI includes a TCI field, the UE 620 is to select the TCI state 636 indicated by the TCI field in the DCI to receive the SPS PDSCH communication. The UE 620 may update the indicated TCI state used for UE-dedicated reception 632 based on the TCI field (e.g., update indicated TCI state used for UE-dedicated reception 632 to be the TCI state 636). The rule 644 may specify that if the DCI is an activation DCI of an SPS PDSCH communication, if the DCI is received in a CORESET 642 associated with a TCI state 646 that is different than the indicated TCI state used for UE-dedicated reception 632, and if the DCI includes a TCI field, the UE 620 is to select the TCI state 646 associated with the CORESET 642 for reception of the SPS PDSCH communication and update the indicated TCI state used for UE-dedicated reception 632 based on the TCI field.

The TCI state that is selected by the UE 620 according to the rule 644 that is applied may be referred to as the selected TCI state 648. The rule 644 may apply whether CORESET 642 is CORESET Type A, CORESET Type B, or CORESET Type C. Note that CORESET Type C lacks clearly defined rules for TCI state selection and the rules described above may apply to CORESET Type C. As shown by reference number 650, the network entity 610 may also select a TCI state according to the rule 644 that the UE 620 is expected to apply. The network entity 610 is expected to select the same TCI state as the selected TCI state 648 selected by the UE 620. In this way, the UE 620 may use the selected TCI state 648 for UE-dedicated PDSCH reception, and the network entity 610 may use a TCI state for PDSCH transmission that corresponds to the selected TCI state 648. As shown by reference number 655, the network entity 610 may transmit the PDSCH communication using a TCI state that corresponds to the selected TCI state 648. As a result of using a more optimal beam, with more flexibility for different scenarios, the UE 620 and the network entity 610 may improve communications and conserve processing resources and signaling resources.

As indicated above, FIG. 6 is provided as an example. Other examples may differ from what is described with respect to FIG. 6.

Figure 7:
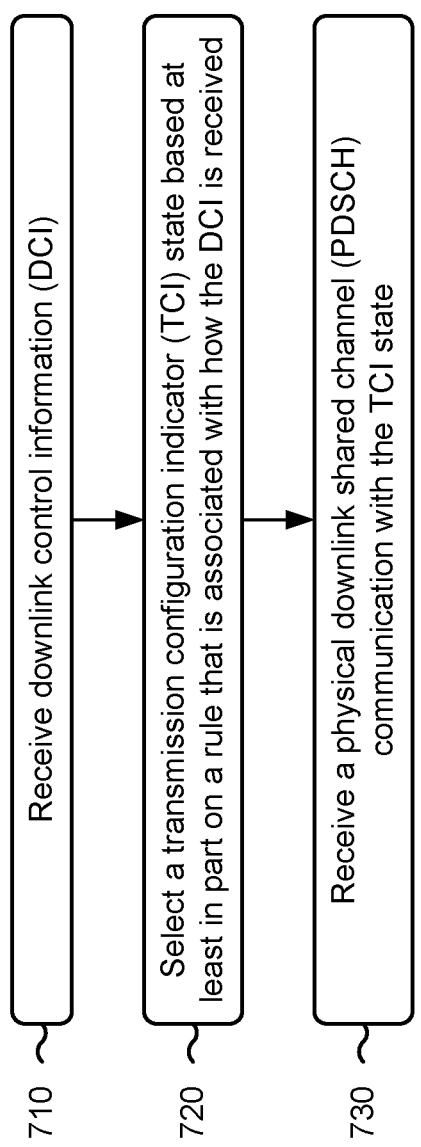
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120, UE 620) performs operations associated with selecting a TCI state for receiving a PDSCH communication.

As shown in FIG. 7, in some aspects, process 700 may include receiving DCI (block 710). For example, the UE (e.g., using communication manager 908 and/or reception component 902 depicted in FIG. 9) may receive DCI, as described above.

As further shown in FIG. 7, in some aspects, process 700 may include selecting a TCI state based at least in part on a rule that is associated with how the DCI is received (block 720). For example, the UE (e.g., using communication manager 908 and/or selection component 910 depicted in FIG. 9) may select a TCI state based at least in part on a rule that is associated with how the DCI is received, as described above.

As further shown in FIG. 7, in some aspects, process 700 may include receiving a PDSCH communication with the TCI state (block 730). For example, the UE (e.g., using communication manager 908 and/or reception component 902 depicted in FIG. 9) may receive a PDSCH communication with the TCI state, as described above.

Process 700 may include additional aspects, such as any single aspect or any combination of aspects described below and/or in connection with one or more other processes described elsewhere herein.

In a first aspect, selecting the TCI state includes determining whether the PDSCH communication is UE-dedicated or non-UE-dedicated based at least in part on the rule, and selecting the TCI state based at least in part on whether the PDSCH communication is UE-dedicated or non-UE-dedicated.

In a second aspect, alone or in combination with the first aspect, the rule specifies that if a scheduling offset from a last symbol of the DCI to a scheduled reception of the PDSCH communication satisfies a threshold, the PDSCH communication is UE-dedicated if the DCI is received in a UE-dedicated search space, and selecting the TCI state includes selecting an indicated TCI state used for UE-dedicated reception.

In a third aspect, alone or in combination with one or more of the first and second aspects, the rule specifies that if a scheduling offset from a last symbol of the DCI to a scheduled reception of the PDSCH communication satisfies a threshold, the PDSCH communication is non-UE-dedicated if the DCI is received in a non-UE-dedicated search space, and selecting the TCI state includes selecting a TCI state of a beam used for receiving the DCI if the DCI has no TCI field.

In a fourth aspect, alone or in combination with one or more of the first through third aspects, the rule specifies that if a scheduling offset from a last symbol of the DCI to a scheduled reception of the PDSCH communication satisfies a threshold, the PDSCH communication is non-UE-dedicated if the DCI is received in a non-UE-dedicated search space, and selecting the TCI state includes selecting an indicated TCI state used for UE-dedicated reception.

In a fifth aspect, alone or in combination with one or more of the first through fourth aspects, the rule specifies that if a scheduling offset from a last symbol of the DCI to a scheduled reception of the PDSCH communication satisfies a threshold, the PDSCH communication is UE-dedicated if the DCI is received in a non-UE-dedicated search space and if the DCI is scrambled by a C-RNTI, an MCS-RNTI, or a CG-RNTI, and selecting the TCI state includes selecting an indicated TCI state used for UE-dedicated reception.

In a sixth aspect, alone or in combination with one or more of the first through fifth aspects, the rule specifies that if a scheduling offset from a last symbol of the DCI to a scheduled reception of the PDSCH communication satisfies a threshold, the UE is to select an indicated TCI state used for UE-dedicated reception if the indicated TCI state and a TCI state of a CORESET that includes the DCI are the same.

In a seventh aspect, alone or in combination with one or more of the first through sixth aspects, process 700 includes updating the indicated TCI state after an application time if a format of the DCI is DCI 1_1 or DCI 1_2.

In an eighth aspect, alone or in combination with one or more of the first through seventh aspects, process 700 includes ignoring a TCI field in the DCI if a format of the DCI is DCI 4_2.

In a ninth aspect, alone or in combination with one or more of the first through eighth aspects, the rule specifies that if a scheduling offset from a last symbol of the DCI to a scheduled reception of the PDSCH communication satisfies a threshold, the UE is to select the TCI state of a beam used for receiving the DCI if the DCI has no TCI field.

In a tenth aspect, alone or in combination with one or more of the first through ninth aspects, the rule specifies that if a scheduling offset from a last symbol of the DCI to a scheduled reception of the PDSCH communication satisfies a threshold, if an indicated TCI state used for UE-dedicated reception and a TCI state of a CORESET that includes the DCI are different, and if the DCI has a TCI field that is used for UE-dedicated TCI indications, the UE is to ignore a TCI field in the DCI.

In an eleventh aspect, alone or in combination with one or more of the first through tenth aspects, the rule specifies that if a scheduling offset from a last symbol of the DCI to a scheduled reception of the PDSCH communication satisfies a threshold, if an indicated TCI state used for UE-dedicated reception and a TCI state of a CORESET that includes the DCI are different, and if the DCI has a TCI field that is used for UE-dedicated TCI indications, the UE is to select a TCI state indicated by the TCI field in the DCI.

In a twelfth aspect, alone or in combination with one or more of the first through eleventh aspects, the rule specifies that if a scheduling offset from a last symbol of the DCI to a scheduled reception of the PDSCH communication satisfies a threshold, if an indicated TCI state used for UE-dedicated reception and a TCI state of a CORESET that includes the DCI are different, and if the DCI has a TCI field that is used for UE-dedicated TCI indications, the UE is to select a TCI state of a beam used for receiving the DCI to receive the PDSCH communication, and update the indicated TCI state based on the TCI field in the DCI.

In a thirteenth aspect, alone or in combination with one or more of the first through twelfth aspects, the rule specifies that if a scheduling offset from a last symbol of the DCI to a scheduled reception of the PDSCH communication satisfies a threshold, if an indicated TCI state used for UE-dedicated reception and a TCI state of a CORESET that includes the DCI are different, and if the DCI has a TCI field that is not used for UE-dedicated TCI indications, the UE is to select a TCI state indicated by the TCI field in the DCI.

In a fourteenth aspect, alone or in combination with one or more of the first through thirteenth aspects, the rule specifies that if the DCI is an activation DCI of an SPS PDSCH communication and if the DCI is received in a UE-dedicated search space, the UE is to select an indicated TCI state used for UE-dedicated reception.

In a fifteenth aspect, alone or in combination with one or more of the first through fourteenth aspects, the rule specifies that if the DCI is an activation DCI of an SPS PDSCH communication and if the DCI is not received in a UE-dedicated search space, the UE is to select a TCI state of a beam used for receiving the DCI.

In a sixteenth aspect, alone or in combination with one or more of the first through fifteenth aspects, the rule specifies that if the DCI is an activation DCI of an SPS PDSCH communication and if the DCI is received in a non-UE-dedicated search space, the UE is to select an indicated TCI state used for UE-dedicated reception.

In a seventeenth aspect, alone or in combination with one or more of the first through sixteenth aspects, the DCI is scrambled with a CS-RNTI.

In an eighteenth aspect, alone or in combination with one or more of the first through seventeenth aspects, the rule specifies that if the DCI is an activation DCI of an SPS PDSCH communication and if the DCI is received in a CORESET associated with an indicated TCI state used for UE-dedicated reception, the UE is to select the indicated TCI state for reception of the SPS PDSCH communication.

In a nineteenth aspect, alone or in combination with one or more of the first through eighteenth aspects, the rule specifies that if the DCI is an activation DCI of an SPS PDSCH communication, if the DCI is received in a CORE-SET associated with a TCI state that is different than an TCI state for UE-dedicated PDSCH reception, and if the DCI does not include a TCI field, the UE is to select the TCI state associated with the CORESET for reception of the SPS PDSCH communication.

In a twentieth aspect, alone or in combination with one or more of the first through nineteenth aspects, the rule specifies that if the DCI is an activation DCI of a semi-persistent scheduling PDSCH communication, if the DCI is received in a CORESET associated with a TCI state that is different than an indicated TCI state used for UE-dedicated reception, and if the DCI includes a TCI field, the UE is to ignore the TCI field.

In a twenty-first aspect, alone or in combination with one or more of the first through twentieth aspects, the rule specifies that if the DCI is an activation DCI of an SPS PDSCH communication, if the DCI is received in a CORE-SET associated with a TCI state that is different than an indicated TCI state used for UE-dedicated reception, and if the DCI includes a TCI field, the UE is to select a TCI state indicated by the TCI field in the DCI for reception of the SPS PDSCH communication, and update the indicated TCI state based on the TCI field.

In a twenty-second aspect, alone or in combination with one or more of the first through twenty-first aspects, the rule specifies that if the DCI is an activation DCI of an SPS PDSCH communication, if the DCI is received in a CORE-SET associated with a TCI state that is different than an indicated TCI state used for UE-dedicated reception, and if the DCI includes a TCI field, the UE is to select the TCI state associated with the CORESET for reception of the SPS PDSCH communication and update the indicated TCI state based on the TCI field.

In a twenty-third aspect, alone or in combination with one or more of the first through twenty-second aspects, the rule applies to CORESET Type A, CORESET Type B, or CORE-SET Type C.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
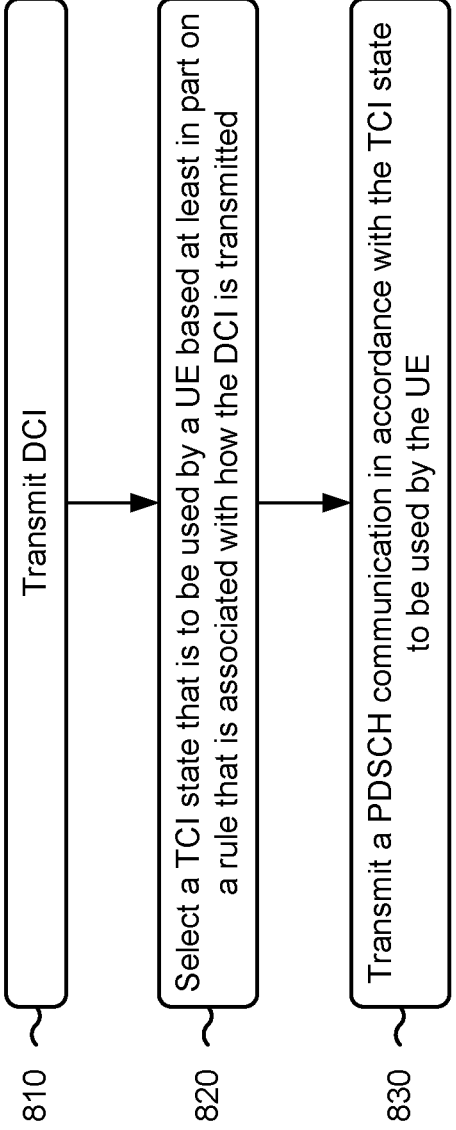
FIG. 8 is a diagram illustrating an example process performed, for example, by a network entity, in accordance with the present disclosure.

FIG. 8 is a diagram illustrating an example process 800 performed, for example, by a network entity, in accordance with the present disclosure. Example process 800 is an example where the network entity (e.g., base station 110, network entity 610) performs operations associated with selecting a TCI state for transmitting a PDSCH communication.

As shown in FIG. 8, in some aspects, process 800 may include transmitting DCI (block 810). For example, the network entity (e.g., using communication manager 1008 and/or transmission component 1004 depicted in FIG. 10) may transmit DCI, as described above.

As further shown in FIG. 8, in some aspects, process 800 may include selecting a TCI state that is to be used by a UE based at least in part on a rule that is associated with how the DCI is transmitted (block 820). For example, the network entity (e.g., using communication manager 1008 and/or selection component 1010 depicted in FIG. 10) may select a TCI state that is to be used by a UE based at least in part on a rule that is associated with how the DCI is transmitted, as described above.

As further shown in FIG. 8, in some aspects, process 800 may include transmitting a PDSCH communication in accordance with the TCI state to be used by the UE (block 830). For example, the network entity (e.g., using communication manager 1008 and/or transmission component 1004 depicted in FIG. 10) may transmit a PDSCH communication in accordance with the TCI state to be used by the UE, as described above.

Process 800 may include additional aspects, such as any single aspect or any combination of aspects described below and/or in connection with one or more other processes described elsewhere herein.

In a first aspect, selecting the TCI state includes determining whether the PDSCH communication is UE-dedicated or non-UE-dedicated based at least in part on the rule, and selecting the TCI state based at least in part on whether the PDSCH communication is UE-dedicated or non-UE-dedicated.

In a second aspect, alone or in combination with the first aspect, the rule specifies that if a scheduling offset from a last symbol of the DCI to a scheduled reception of the PDSCH communication by the UE satisfies a threshold, the PDSCH communication is UE-dedicated if the DCI is transmitted in a UE-dedicated search space, and selecting the TCI state includes selecting an indicated TCI state used for UE-dedicated reception.

In a third aspect, alone or in combination with one or more of the first and second aspects, the rule specifies that if a scheduling offset from a last symbol of the DCI to a scheduled reception of the PDSCH communication by the UE satisfies a threshold, the PDSCH communication is non-UE-dedicated if the DCI is transmitted in a non-UE-dedicated search space, and selecting the TCI state includes selecting a TCI state of a beam that the UE is to use for receiving the DCI if the DCI has no TCI field.

In a fourth aspect, alone or in combination with one or more of the first through third aspects, the rule specifies that if a scheduling offset from a last symbol of the DCI to a scheduled reception of the PDSCH communication satisfies a threshold, the PDSCH communication is non-UE-dedicated if the DCI is transmitted in a non-UE-dedicated search space, and selecting the TCI state includes selecting an indicated TCI state used for UE-dedicated reception.

In a fifth aspect, alone or in combination with one or more of the first through fourth aspects, the rule specifies that if a scheduling offset from a last symbol of the DCI to a scheduled reception of the PDSCH communication by the UE satisfies a threshold, the PDSCH communication is UE-dedicated if the DCI is transmitted in a non-UE-dedicated search space and if the DCI is scrambled by a C-RNTI, an MCS-RNTI, or a CG-RNTI, and selecting the TCI state includes selecting an indicated TCI state used for UE-dedicated reception.

In a sixth aspect, alone or in combination with one or more of the first through fifth aspects, the rule specifies that if a scheduling offset from a last symbol of the DCI to a scheduled reception of the PDSCH communication by the UE satisfies a threshold, the UE is to select an indicated TCI state used for UE-dedicated reception if the indicated TCI state and a TCI state of a CORESET that includes the DCI are the same.

In a seventh aspect, alone or in combination with one or more of the first through sixth aspects, the rule specifies that if a scheduling offset from a last symbol of the DCI to a scheduled reception of the PDSCH communication by the UE satisfies a threshold, the UE is to select the TCI state of a beam used for receiving the DCI if the DCI has no TCI field.

In an eighth aspect, alone or in combination with one or more of the first through seventh aspects, the rule specifies that if a scheduling offset from a last symbol of the DCI to a scheduled reception of the PDSCH communication by the UE satisfies a threshold, if an indicated TCI state used for UE-dedicated reception and a TCI state of a CORESET that includes the DCI are different, and if the DCI has a TCI field that is used for UE-dedicated TCI indications, the UE is to ignore a TCI field in the DCI.

In a ninth aspect, alone or in combination with one or more of the first through eighth aspects, the rule specifies that if a scheduling offset from a last symbol of the DCI to a scheduled reception of the PDSCH communication by the UE satisfies a threshold, if an indicated TCI state used for UE-dedicated reception and a TCI state of a CORESET that includes the DCI are different, and if the DCI has a TCI field that is used for UE-dedicated TCI indications, the UE is to select a TCI state indicated by the TCI field.

In a tenth aspect, alone or in combination with one or more of the first through ninth aspects, the rule specifies that if a scheduling offset from a last symbol of the DCI to a scheduled reception of the PDSCH communication satisfies a threshold, if an indicated TCI state used for UE-dedicated reception and a TCI state of a CORESET that includes the DCI are different, and if the DCI has a TCI field that is used for UE-dedicated TCI indications, the UE is to select a TCI state of a beam used for receiving the DCI to receive the PDSCH communication, and update the indicated TCI state based on the TCI field.

In an eleventh aspect, alone or in combination with one or more of the first through tenth aspects, the rule specifies that if a scheduling offset from a last symbol of the DCI to a scheduled reception of the PDSCH communication by the UE satisfies a threshold, if an indicated TCI state used for UE-dedicated reception and a TCI state of a CORESET that includes the DCI are different, and if the DCI has a TCI field that is not used for UE-dedicated TCI indications, the UE is to select a TCI state indicated by the TCI field.

In a twelfth aspect, alone or in combination with one or more of the first through eleventh aspects, the rule specifies that if the DCI is an activation DCI of an SPS PDSCH communication and if the DCI is transmitted in a UE-dedicated search space, the UE is to select an indicated TCI state used for UE-dedicated reception.

In a thirteenth aspect, alone or in combination with one or more of the first through twelfth aspects, the rule specifies that if the DCI is an activation DCI of an SPS PDSCH communication and if the DCI is not transmitted in a UE-dedicated search space, the UE is to select a TCI state of a beam used for receiving the DCI.

In a fourteenth aspect, alone or in combination with one or more of the first through thirteenth aspects, the rule specifies that if the DCI is an activation DCI of an SPS PDSCH communication and if the DCI is transmitted in a non-UE-dedicated search space, the UE is to select an indicated TCI state used for UE-dedicated reception.

In a fifteenth aspect, alone or in combination with one or more of the first through fourteenth aspects, the DCI is scrambled with a CG-RNTI.

In a sixteenth aspect, alone or in combination with one or more of the first through fifteenth aspects, the rule specifies that if the DCI is an activation DCI of an SPS PDSCH communication and if the DCI is transmitted in a CORESET associated with an indicated TCI state used for UE-dedicated reception, the UE is to select the indicated TCI state for reception of the SPS PDSCH communication.

In a seventeenth aspect, alone or in combination with one or more of the first through sixteenth aspects, the rule specifies that if the DCI is an activation DCI of an SPS PDSCH communication, if the DCI is transmitted in a CORESET associated with a TCI state that is different than an indicated TCI state used for UE-dedicated reception, and if the DCI does not include a TCI field, the UE is to select the TCI state associated with the CORESET for reception of the SPS PDSCH communication.

In an eighteenth aspect, alone or in combination with one or more of the first through seventeenth aspects, the rule specifies that if the DCI is an activation DCI of an SPS PDSCH communication, if the DCI is transmitted in a CORESET associated with a TCI state that is different than an indicated TCI state used for UE-dedicated reception, and if the DCI includes a TCI field, the UE is to ignore the TCI field.

In a nineteenth aspect, alone or in combination with one or more of the first through eighteenth aspects, the rule specifies that if the DCI is an activation DCI of an SPS PDSCH communication, if the DCI is transmitted in a CORESET associated with a TCI state that is different than an indicated TCI state used for UE-dedicated reception, and if the DCI includes a TCI field, the UE is to select a TCI state indicated by the TCI field for reception of the SPS PDSCH communication and update the indicated TCI state based on the TCI field.

In a twentieth aspect, alone or in combination with one or more of the first through nineteenth aspects, the rule specifies that if the DCI is an activation DCI of an SPS PDSCH communication, if the DCI is transmitted in a CORESET associated with a TCI state that is different than an indicated TCI state used for UE-dedicated reception, and if the DCI includes a TCI field, the UE is to select the TCI state associated with the CORESET for reception of the SPS PDSCH communication and update the indicated TCI state based on the TCI field.

In a twenty-first aspect, alone or in combination with one or more of the first through twentieth aspects, the rule applies to CORESET Type A, CORESET Type B, or CORESET Type C.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
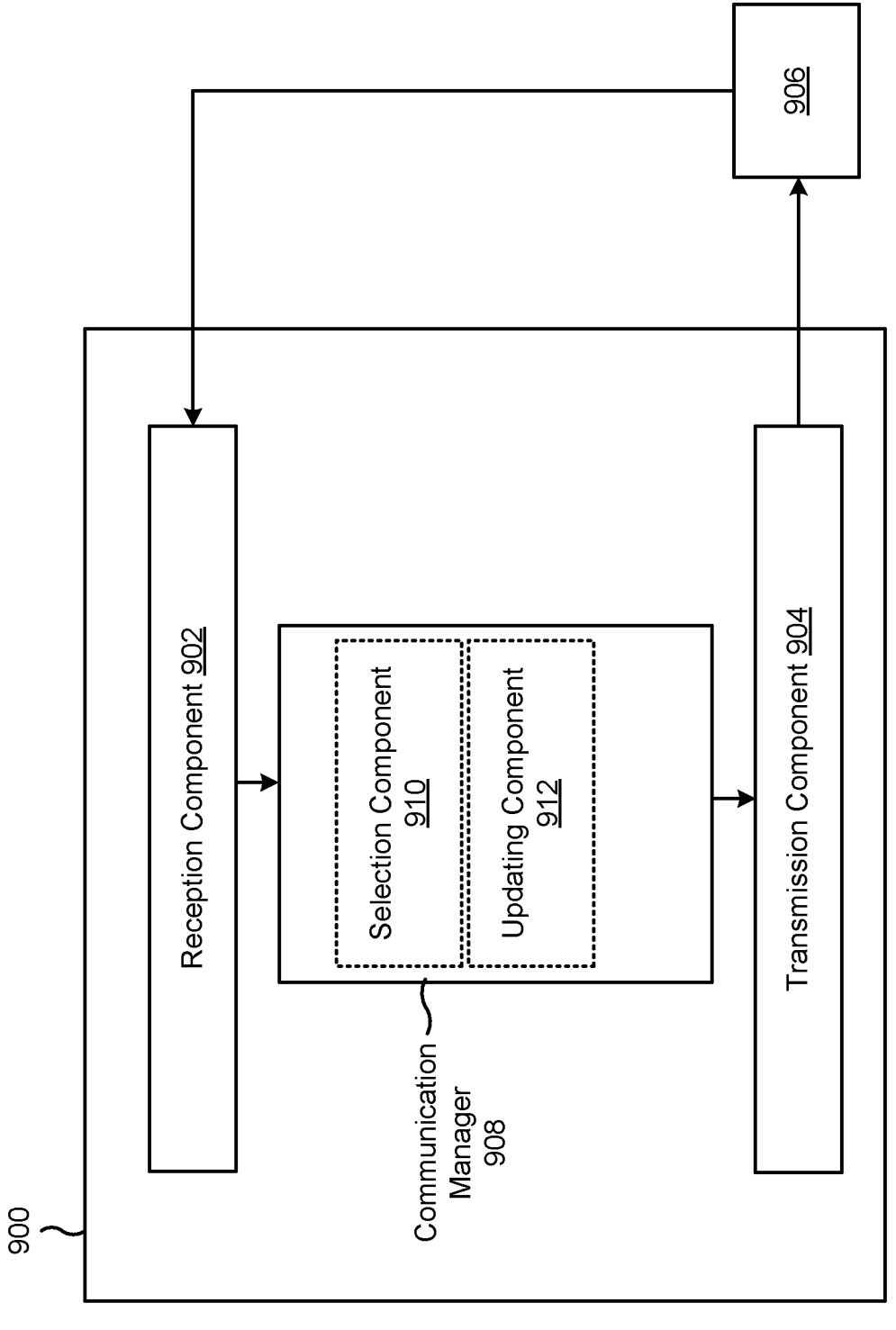
FIGS. 9-10 are diagrams of example apparatuses for wireless communication, in accordance with the present disclosure.

FIG. 9 is a diagram of an example apparatus 900 for wireless communication. The apparatus 900 may be a UE (e.g., UE 620), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908. The communication manager 908 may control and/or otherwise manage one or more operations of the reception component 902 and/or the transmission component 904. In some aspects, the communication manager 908 may include one or more antennas, a modem, a controller/processor, a memory, or a combination thereof, of the UE 120 described in connection with FIG. 2. The communication manager 908 may be, or be similar to, the communication manager 150 depicted in FIGS. 1 and 2. For example, in some aspects, the communication manager 908 may be configured to perform one or more of the functions described as being performed by the communication manager 150. In some aspects, the communication manager 908 may include the reception component 902 and/or the transmission component 904. The communication manager 908 may include a selection component 910 and/or an updating component 912, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE 120 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive DCI. The selection component 910 may select a TCI state based at least in part on a rule that is associated with how the DCI is received. The reception component 902 may receive a PDSCH communication with the TCI state.

The updating component 912 may update the indicated TCI state after an application time if a format of the DCI is DCI 1_1 or DCI 1_2. The selection component 910 may ignore a TCI field in the DCI if a format of the DCI is DCI 4_2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
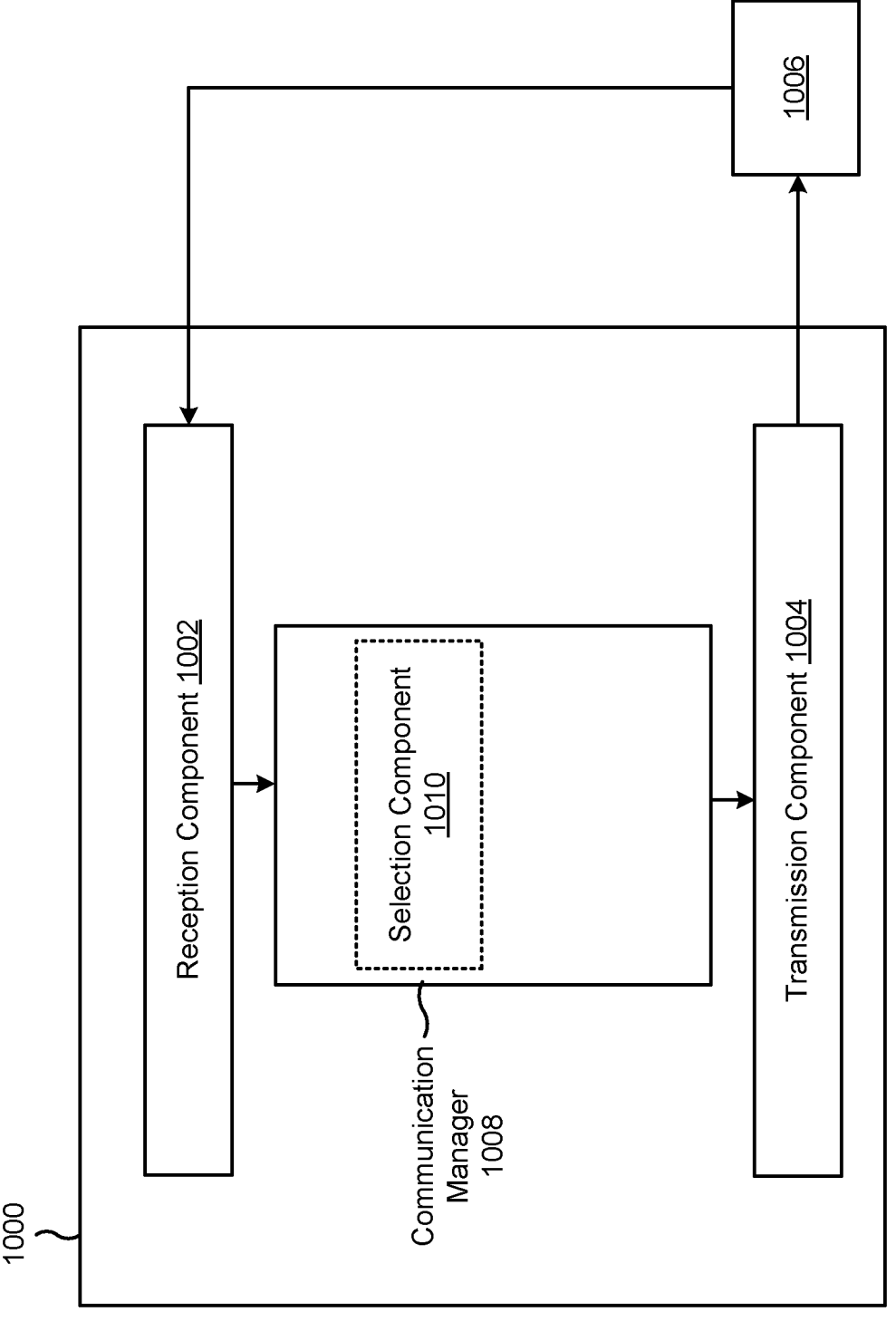

FIG. 10 is a diagram of an example apparatus 1000 for wireless communication. The apparatus 1000 may be a network entity (e.g., network entity 610), or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the network entity described in connection with FIG. 2. The communication manager 1008 may be, or be similar to, the communication manager 150 depicted in FIGS. 1 and 2. For example, in some aspects, the communication manager 1008 may be configured to perform one or more of the functions described as being performed by the communication manager 150. In some aspects, the communication manager 1008 may include the reception component 1002 and/or the transmission component 1004. The communication manager 1008 may include a selection component 1010, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described in connection with FIG. 2. In some aspects, the transmission component 1004 may be co-located with the reception component 1002 in a transceiver.

The transmission component 1004 may transmit DCI. The selection component 1010 may select a TCI state that is to be used by a UE based at least in part on a rule that is associated with how the DCI is transmitted. The transmission component 1004 may transmit a PDSCH communication in accordance with the TCI state to be used by the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving downlink control information (DCI); selecting a transmission configuration indicator (TCI) state based at least in part on a rule that is associated with how the DCI is received; and receiving a physical downlink shared channel (PDSCH) communication with the TCI state.

Aspect 2: The method of Aspect 1, wherein selecting the TCI state includes: determining whether the PDSCH communication is UE-dedicated or non-UE-dedicated based at least in part on the rule; and selecting the TCI state based at least in part on whether the PDSCH communication is UE-dedicated or non-UE-dedicated.

Aspect 3: The method of Aspect 2, wherein the rule specifies that if a scheduling offset from a last symbol of the DCI to a scheduled reception of the PDSCH communication satisfies a threshold, the PDSCH communication is UE-dedicated if the DCI is received in a UE-dedicated search space, and wherein selecting the TCI state includes selecting an indicated TCI state used for UE-dedicated reception.

Aspect 4: The method of Aspect 2, wherein the rule specifies that if a scheduling offset from a last symbol of the DCI to a scheduled reception of the PDSCH communication satisfies a threshold, the PDSCH communication is non-UE-dedicated if the DCI is received in a non-UE-dedicated search space, and wherein selecting the TCI state includes selecting a TCI state of a beam used for receiving the DCI if the DCI has no TCI field.

Aspect 5: The method of Aspect 2, wherein the rule specifies that if a scheduling offset from a last symbol of the DCI to a scheduled reception of the PDSCH communication satisfies a threshold, the PDSCH communication is non-UE-dedicated if the DCI is received in a non-UE-dedicated search space, and wherein selecting the TCI state includes selecting an indicated TCI state used for UE-dedicated reception.

Aspect 6: The method of Aspect 2, wherein the rule specifies that if a scheduling offset from a last symbol of the DCI to a scheduled reception of the PDSCH communication satisfies a threshold, the PDSCH communication is UE-dedicated if the DCI is received in a non-UE-dedicated search space and if the DCI is scrambled by a cell radio network temporary identifier (C-RNTI), a modulation and coding scheme RNTI (MCS-RNTI), or a configured scheduling RNTI (CG-RNTI), and wherein selecting the TCI state includes selecting an indicated TCI state used for UE-dedicated reception.

Aspect 7: The method of Aspect 1, wherein the rule specifies that if a scheduling offset from a last symbol of the DCI to a scheduled reception of the PDSCH communication satisfies a threshold, the UE is to select an indicated TCI state used for UE-dedicated reception if the indicated TCI state and a TCI state of a control resource set that includes the DCI are the same.

Aspect 8: The method of Aspect 7, further comprising updating the indicated TCI state after an application time if a format of the DCI is DCI 1_1 or DCI 1_2.

Aspect 9: The method of Aspect 7, further comprising ignoring a TCI field in the DCI if a format of the DCI is DCI 4_2.

Aspect 10: The method of Aspect 1, wherein the rule specifies that if a scheduling offset from a last symbol of the DCI to a scheduled reception of the PDSCH communication satisfies a threshold, the UE is to select the TCI state of a beam used for receiving the DCI if the DCI has no TCI field.

Aspect 11: The method of Aspect 1, wherein the rule specifies that if a scheduling offset from a last symbol of the DCI to a scheduled reception of the PDSCH communication satisfies a threshold, if an indicated TCI state used for UE-dedicated reception and a TCI state of a control resource set that includes the DCI are different, and if the DCI has a TCI field that is used for UE-dedicated TCI indications, the UE is to ignore a TCI field in the DCI.

Aspect 12: The method of Aspect 1, wherein the rule specifies that if a scheduling offset from a last symbol of the DCI to a scheduled reception of the PDSCH communication satisfies a threshold, if an indicated TCI state used for UE-dedicated reception and a TCI state of a control resource set that includes the DCI are different, and if the DCI has a TCI field that is used for UE-dedicated TCI indications, the UE is to select a TCI state indicated by the TCI field in the DCI.

Aspect 13: The method of Aspect 1, wherein the rule specifies that if a scheduling offset from a last symbol of the DCI to a scheduled reception of the PDSCH communication satisfies a threshold, if an indicated TCI state used for UE-dedicated reception and a TCI state of a control resource set that includes the DCI are different, and if the DCI has a TCI field that is used for UE-dedicated TCI indications, the UE is to select a TCI state of a beam used for receiving the DCI to receive the PDSCH communication, and update the indicated TCI state based on the TCI field in the DCI.

Aspect 14: The method of Aspect 1, wherein the rule specifies that if a scheduling offset from a last symbol of the DCI to a scheduled reception of the PDSCH communication satisfies a threshold, if an indicated TCI state used for UE-dedicated reception and a TCI state of a control resource set that includes the DCI are different, and if the DCI has a TCI field that is not used for UE-dedicated TCI indications, the UE is to select a TCI state indicated by the TCI field in the DCI.

Aspect 15: The method of Aspect 1, wherein the rule specifies that if the DCI is an activation DCI of a semi-persistent scheduling PDSCH communication and if the DCI is received in a UE-dedicated search space, the UE is to select an indicated TCI state used for UE-dedicated reception.

Aspect 16: The method of Aspect 15, wherein the rule specifies that if the DCI is an activation DCI of a semi-persistent scheduling PDSCH communication and if the DCI is not received in a UE-dedicated search space, the UE is to select a TCI state of a beam used for receiving the DCI.

Aspect 17: The method of Aspect 1, wherein the rule specifies that if the DCI is an activation DCI of a semi-persistent scheduling PDSCH communication and if the DCI is received in a non-UE-dedicated search space, the UE is to select an indicated TCI state used for UE-dedicated reception.

Aspect 18: The method of Aspect 17, wherein the DCI is scrambled with a configured scheduling radio network temporary identifier.

Aspect 19: The method of Aspect 1, wherein the rule specifies that if the DCI is an activation DCI of a semi-persistent scheduling (SPS) PDSCH communication and if the DCI is received in a control resource set associated with an indicated TCI state used for UE-dedicated reception, the UE is to select the indicated TCI state for reception of the SPS PDSCH communication.

Aspect 20: The method of Aspect 1, wherein the rule specifies that if the DCI is an activation DCI of a semi-persistent scheduling (SPS) PDSCH communication, if the DCI is received in a control resource set (CORESET) associated with a TCI state that is different than an TCI state for UE-dedicated PDSCH reception, and if the DCI does not include a TCI field, the UE is to select the TCI state associated with the CORESET for reception of the SPS PDSCH communication.

Aspect 21: The method of Aspect 1, wherein the rule specifies that if the DCI is an activation DCI of a semi-persistent scheduling PDSCH communication, if the DCI is received in a control resource set associated with a TCI state that is different than an indicated TCI state used for UE-dedicated reception, and if the DCI includes a TCI field, the UE is to ignore the TCI field.

Aspect 22: The method of Aspect 1, wherein the rule specifies that if the DCI is an activation DCI of a semi-persistent scheduling (SPS) PDSCH communication, if the DCI is received in a control resource set associated with a TCI state that is different than an indicated TCI state used for UE-dedicated reception, and if the DCI includes a TCI field, the UE is to select a TCI state indicated by the TCI field in the DCI for reception of the SPS PDSCH communication, and update the indicated TCI state based on the TCI field.

Aspect 23: The method of Aspect 1, wherein the rule specifies that if the DCI is an activation DCI of a semi-persistent scheduling (SPS) PDSCH communication, if the DCI is received in a control resource set (CORESET) associated with a TCI state that is different than an indicated TCI state used for UE-dedicated reception, and if the DCI includes a TCI field, the UE is to select the TCI state associated with the CORESET for reception of the SPS PDSCH communication and update the indicated TCI state based on the TCI field.

Aspect 24: The method of any of Aspects 1-23, wherein the rule applies to control resource set (CORESET) Type A, CORESET Type B, or CORESET Type C.

Aspect 25: A method of wireless communication performed by a network entity, comprising: transmitting downlink control information (DCI); selecting a transmission configuration indicator (TCI) state that is to be used by a user equipment (UE) based at least in part on a rule that is associated with how the DCI is transmitted; and transmitting a physical downlink shared channel (PDSCH) communication in accordance with the TCI state to be used by the UE.

Aspect 26: The method of Aspect 25, wherein selecting the TCI state includes: determining whether the PDSCH communication is UE-dedicated or non-UE-dedicated based at least in part on the rule; and selecting the TCI state based at least in part on whether the PDSCH communication is UE-dedicated or non-UE-dedicated.

Aspect 27: The method of Aspect 26, wherein the rule specifies that if a scheduling offset from a last symbol of the DCI to a scheduled reception of the PDSCH communication by the UE satisfies a threshold, the PDSCH communication is UE-dedicated if the DCI is transmitted in a UE-dedicated search space, and wherein selecting the TCI state includes selecting an indicated TCI state used for UE-dedicated reception.

Aspect 28: The method of Aspect 26, wherein the rule specifies that if a scheduling offset from a last symbol of the DCI to a scheduled reception of the PDSCH communication by the UE satisfies a threshold, the PDSCH communication is non-UE-dedicated if the DCI is transmitted in a non-UE-dedicated search space, and wherein selecting the TCI state includes selecting a TCI state of a beam that the UE is to use for receiving the DCI if the DCI has no TCI field.

Aspect 29: The method of Aspect 26, wherein the rule specifies that if a scheduling offset from a last symbol of the DCI to a scheduled reception of the PDSCH communication satisfies a threshold, the PDSCH communication is non-UE-dedicated if the DCI is transmitted in a non-UE-dedicated search space, and wherein selecting the TCI state includes selecting an indicated TCI state used for UE-dedicated reception.

Aspect 30: The method of Aspect 26, wherein the rule specifies that if a scheduling offset from a last symbol of the DCI to a scheduled reception of the PDSCH communication by the UE satisfies a threshold, the PDSCH communication is UE-dedicated if the DCI is transmitted in a non-UE-dedicated search space and if the DCI is scrambled by a cell radio network temporary identifier (C-RNTI), a modulation and coding scheme RNTI (MCS-RNTI), or a configured scheduling RNTI (CG-RNTI), and wherein selecting the TCI state includes selecting an indicated TCI state used for UE-dedicated reception.

Aspect 31: The method of Aspect 25, wherein the rule specifies that if a scheduling offset from a last symbol of the DCI to a scheduled reception of the PDSCH communication by the UE satisfies a threshold, the UE is to select an indicated TCI state used for UE-dedicated reception if the indicated TCI state and a TCI state of a control resource set that includes the DCI are the same.

Aspect 32: The method of Aspect 25, wherein the rule specifies that if a scheduling offset from a last symbol of the DCI to a scheduled reception of the PDSCH communication by the UE satisfies a threshold, the UE is to select the TCI state of a beam used for receiving the DCI if the DCI has no TCI field.

Aspect 33: The method of Aspect 25, wherein the rule specifies that if a scheduling offset from a last symbol of the DCI to a scheduled reception of the PDSCH communication by the UE satisfies a threshold, if an indicated TCI state used for UE-dedicated reception and a TCI state of a control resource set that includes the DCI are different, and if the DCI has a TCI field that is used for UE-dedicated TCI indications, the UE is to ignore a TCI field in the DCI.

Aspect 34: The method of Aspect 25, wherein the rule specifies that if a scheduling offset from a last symbol of the DCI to a scheduled reception of the PDSCH communication by the UE satisfies a threshold, if an indicated TCI state used for UE-dedicated reception and a TCI state of a control resource set that includes the DCI are different, and if the DCI has a TCI field that is used for UE-dedicated TCI indications, the UE is to select a TCI state indicated by the TCI field.

Aspect 35: The method of Aspect 25, wherein the rule specifies that if a scheduling offset from a last symbol of the DCI to a scheduled reception of the PDSCH communication satisfies a threshold, if an indicated TCI state used for UE-dedicated reception and a TCI state of a control resource set that includes the DCI are different, and if the DCI has a TCI field that is used for UE-dedicated TCI indications, the UE is to select a TCI state of a beam used for receiving the DCI to receive the PDSCH communication, and update the indicated TCI state based on the TCI field.

Aspect 36: The method of Aspect 25, wherein the rule specifies that if a scheduling offset from a last symbol of the DCI to a scheduled reception of the PDSCH communication by the UE satisfies a threshold, if an indicated TCI state used for UE-dedicated reception and a TCI state of a control resource set that includes the DCI are different, and if the DCI has a TCI field that is not used for UE-dedicated TCI indications, the UE is to select a TCI state indicated by the TCI field.

Aspect 37: The method of Aspect 25, wherein the rule specifies that if the DCI is an activation DCI of a semi-persistent scheduling PDSCH communication and if the DCI is transmitted in a UE-dedicated search space, the UE is to select an indicated TCI state used for UE-dedicated reception.

Aspect 38: The method of Aspect 37, wherein the rule specifies that if the DCI is an activation DCI of a semi-persistent scheduling PDSCH communication and if the DCI is not transmitted in a UE-dedicated search space, the UE is to select a TCI state of a beam used for receiving the DCI.

Aspect 39: The method of Aspect 25, wherein the rule specifies that if the DCI is an activation DCI of a semi-persistent scheduling PDSCH communication and if the DCI is transmitted in a non-UE-dedicated search space, the UE is to select an indicated TCI state used for UE-dedicated reception.

Aspect 40: The method of Aspect 39, wherein the DCI is scrambled with a configured scheduling radio network temporary identifier.

Aspect 41: The method of Aspect 25, wherein the rule specifies that if the DCI is an activation DCI of a semi-persistent scheduling (SPS) PDSCH communication and if the DCI is transmitted in a control resource set associated with an indicated TCI state used for UE-dedicated reception, the UE is to select the indicated TCI state for reception of the SPS PDSCH communication.

Aspect 42: The method of Aspect 25, wherein the rule specifies that if the DCI is an activation DCI of a semi-persistent scheduling (SPS) PDSCH communication, if the DCI is transmitted in a control resource set (CORESET) associated with a TCI state that is different than an indicated TCI state used for UE-dedicated reception, and if the DCI does not include a TCI field, the UE is to select the TCI state associated with the CORESET for reception of the SPS PDSCH communication.

Aspect 43: The method of Aspect 25, wherein the rule specifies that if the DCI is an activation DCI of a semi-persistent scheduling PDSCH communication, if the DCI is transmitted in a control resource set associated with a TCI state that is different than an indicated TCI state used for UE-dedicated reception, and if the DCI includes a TCI field, the UE is to ignore the TCI field.

Aspect 44: The method of Aspect 25, wherein the rule specifies that if the DCI is an activation DCI of a semi-persistent scheduling (SPS) PDSCH communication, if the DCI is transmitted in a control resource set associated with a TCI state that is different than an indicated TCI state used for UE-dedicated reception, and if the DCI includes a TCI field, the UE is to select a TCI state indicated by the TCI field for reception of the SPS PDSCH communication and update the indicated TCI state based on the TCI field.

Aspect 45: The method of Aspect 25, wherein the rule specifies that if the DCI is an activation DCI of a semi-persistent scheduling (SPS) PDSCH communication, if the DCI is transmitted in a control resource set (CORESET) associated with a TCI state that is different than an indicated TCI state used for UE-dedicated reception, and if the DCI includes a TCI field, the UE is to select the TCI state associated with the CORESET for reception of the SPS PDSCH communication and update the indicated TCI state based on the TCI field.

Aspect 46: The method of any of Aspects 25-45, wherein the rule applies to control resource set (CORESET) Type A, CORESET Type B, or CORESET Type C.

Aspect 47: An apparatus for wireless communication at a device, comprising a processor; memory coupled with the processor; and instructions stored in the memory and executable by the processor to cause the apparatus to perform the method of one or more of Aspects 1-46.

Aspect 48: A device for wireless communication, comprising a memory and one or more processors coupled to the memory, the one or more processors configured to perform the method of one or more of Aspects 1-46.

Aspect 49: An apparatus for wireless communication, comprising at least one means for performing the method of one or more of Aspects 1-46.

Aspect 50: A non-transitory computer-readable medium storing code for wireless communication, the code comprising instructions executable by a processor to perform the method of one or more of Aspects 1-46.

Aspect 51: A non-transitory computer-readable medium storing a set of instructions for wireless communication, the set of instructions comprising one or more instructions that, when executed by one or more processors of a device, cause the device to perform the method of one or more of Aspects 1-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or memories; and
   one or more processors, coupled to the one or more memories, configured to:
      receive downlink control information (DCI);
      select, based on a scheduling offset from a last symbol of the DCI to a scheduled reception of a physical downlink shared channel (PDSCH) communication satisfying a threshold, and based at least in part on a rule that is associated with how the DCI is received, a transmission configuration indicator (TCI) state, wherein the rule specifies that if the scheduling offset satisfies the threshold, the UE is to select an indicated TCI state used for UE-dedicated reception; and
      receive the PDSCH communication with the TCI state.

2. The UE of claim 1, wherein the one or more processors, to select the TCI state, are configured to:
   determine whether the PDSCH communication is UE-dedicated or non-UE- dedicated based at least in part on the rule; and
   select the TCI state based at least in part on whether the PDSCH communication is UE-dedicated or non-UE-dedicated.

3. The UE of claim 2,
   wherein the rule specifies that if the scheduling offset satisfies the threshold, the PDSCH communication is UE-dedicated if the DCI is received in a UE-dedicated search space, and wherein the one or more processors, to select the TCI state, are configured to select the indicated TCI state used for the UE-dedicated reception.

4. The UE of claim 2,
wherein the rule specifies that if the scheduling offset satisfies the threshold, the PDSCH communication is non-UE-dedicated if the DCI is received in a non-UE-dedicated search space, and wherein the one or more processors, to select the TCI state, are configured to select a TCI state of a beam used for receiving the DCI if the DCI has no TCI field.

5. The UE of claim 2,
wherein the rule specifies that if the scheduling offset satisfies the threshold, the PDSCH communication is non-UE-dedicated if the DCI is received in a non-UE-dedicated search space, and wherein the one or more processors, to select the TCI state, are configured to select the indicated TCI state used for the UE-dedicated reception.

6. The UE of claim 2,
wherein the rule specifies that if the scheduling offset satisfies the threshold, the PDSCH communication is UE-dedicated if the DCI is received in a non-UE-dedicated search space and if the DCI is scrambled by a cell radio network temporary identifier (C-RNTI), a modulation and coding scheme RNTI (MCS-RNTI), or a configured scheduling RNTI (CG-RNTI), and wherein the one or more processors, to select the TCI state, are configured to select the indicated TCI state used for the UE-dedicated reception.

7. The UE of claim 1,
wherein the UE is to select the indicated TCI state used for UE-dedicated reception if the indicated TCI state and a TCI state of a control resource set that includes the DCI are the same.

8. The UE of claim 1,
wherein the one or more processors are configured to update the indicated TCI state after an application time if a format of the DCI is DCI 11 or DCI 12.

9. The UE of claim 1,
wherein the one or more processors are configured to ignore a TCI field in the DCI if a format of the DCI is DCI 4_2.

10. The UE of claim 1,
wherein the rule specifies that if the scheduling offset satisfies the threshold, the UE is to select the TCI state of a beam used for receiving the DCI if the DCI has no TCI field.

11. The UE of claim 1,
wherein the rule specifies that if the scheduling offset satisfies the threshold, if the indicated TCI state used for the UE-dedicated reception and a TCI state of a control resource set that includes the DCI are different, and if the DCI has a TCI field that is used for UE-dedicated TCI indications, the UE is to ignore a TCI field in the DCI.

12. The UE of claim 1,
wherein the rule specifies that if the scheduling offset satisfies the threshold, if the indicated TCI state used for the UE-dedicated reception and a TCI state of a control resource set that includes the DCI are different, and if the DCI has a TCI field that is used for UE-dedicated TCI indications, the UE is to select a TCI state indicated by the TCI field in the DCI.

13. The UE of claim 1,
wherein the rule specifies that if the scheduling offset satisfies the threshold, if the indicated TCI state used for the UE-dedicated reception and a TCI state of a control resource set that includes the DCI are different, and if the DCI has a TCI field that is used for UE-dedicated TCI indications, the UE is to select a TCI state of a beam used for receiving the DCI to receive the PDSCH communication, and update the indicated TCI state based on the TCI field in the DCI.

14. The UE of claim 1,
wherein the rule specifies that if the scheduling offset satisfies the threshold, if the indicated TCI state used for the UE-dedicated reception and a TCI state of a control resource set that includes the DCI are different, and if the DCI has a TCI field that is not used for UE-dedicated TCI indications, the UE is to select a TCI state indicated by the TCI field in the DCI.

15. The UE of claim 1,
wherein the rule specifies that if the DCI is an activation DCI of a semi-persistent scheduling PDSCH communication and if the DCI is received in a UE-dedicated search space, the UE is to select the indicated TCI state used for the UE-dedicated reception.

16. The UE of claim 15,
wherein the rule specifies that if the DCI is an activation DCI of a semi-persistent scheduling PDSCH communication and if the DCI is not received in a UE-dedicated search space, the UE is to select a TCI state of a beam used for receiving the DCI.

17. The UE of claim 1,
wherein the rule specifies that if the DCI is an activation DCI of a semi-persistent scheduling PDSCH communication and if the DCI is received in a non-UE-dedicated search space, the UE is to select the indicated TCI state used for the UE-dedicated reception.

18. The UE of claim 17,
wherein the DCI is scrambled with a configured scheduling radio network temporary identifier.

19. The UE of claim 1,
wherein the rule specifies that if the DCI is an activation DCI of a semi-persistent scheduling (SPS) PDSCH communication and if the DCI is received in a control resource set associated with the indicated TCI state used for the UE-dedicated reception, the UE is to select the indicated TCI state for reception of the SPS PDSCH communication.

20. The UE of claim 1,
wherein the rule specifies that if the DCI is an activation DCI of a semi-persistent scheduling (SPS) PDSCH communication, if the DCI is received in a control resource set (CORESET) associated with a TCI state that is different than an TCI state for UE-dedicated PDSCH reception, and if the DCI does not include a TCI field, the UE is to select the TCI state associated with the CORESET for reception of the SPS PDSCH communication.

21. The UE of claim 1,
wherein the rule specifies that if the DCI is an activation DCI of a semi-persistent scheduling PDSCH communication, if the DCI is received in a control resource set associated with a TCI state that is different than the indicated TCI state used for the UE-dedicated reception, and if the DCI includes a TCI field, the UE is to ignore the TCI field.

22. The UE of claim 1,
wherein the rule specifies that if the DCI is an activation DCI of a semi-persistent scheduling (SPS) PDSCH communication, if the DCI is received in a control resource set associated with a TCI state that is different than the indicated TCI state used for the UE-dedicated reception, and if the DCI includes a TCI field, the UE is to select a TCI state indicated by the TCI field in the DCI for reception of the SPS PDSCH communication, and update the indicated TCI state based on the TCI field.

23. The UE of claim 1, wherein the rule specifies that if the DCI is an activation DCI of a semi-persistent scheduling (SPS) PDSCH communication, if the DCI is received in a control resource set (CORESET) associated with a TCI state that is different than the indicated TCI state used for the UE-dedicated reception, and if the DCI includes a TCI field, the UE is to select the TCI state associated with the CORESET for reception of the SPS PDSCH communication and update the indicated TCI state based on the TCI field.

24. A network entity for wireless communication, comprising:

one or more memories; and one or more processors, coupled to the one or more memories, configured to:

transmit downlink control information (DCI);

select, based on a scheduling offset from a last symbol of the DCI to a scheduled reception of a physical downlink shared channel (PDSCH) communication by a user equipment (UE) satisfying a threshold, and based at least in part on a rule that is associated with how the DCI is received, a transmission configuration indicator (TCI) state that is to be used by the UE, wherein the rule specifies that if the scheduling offset satisfies the threshold, the UE is to select an indicated TCI state used for UE-dedicated reception; and transmit the PDSCH communication in accordance with the TCI state to be used by the UE.

25. The network entity of claim 24, wherein the rule specifies that if the scheduling offset satisfies the threshold, the UE is to select the TCI state of a beam used for receiving the DCI if the DCI has no TCI field.

26. The network entity of claim 24, wherein the rule specifies that if the scheduling offset satisfies the threshold, if the indicated TCI state used for the UE-dedicated reception and a TCI state of a control resource set that includes the DCI are different, and if the DCI has a TCI field that is used for UE-dedicated TCI indications, the UE is to select a TCI state indicated by the TCI field.

27. A method of wireless communication performed by a user equipment (UE), comprising:

receiving downlink control information (DCI);

selecting, based on a scheduling offset from a last symbol of the DCI to a scheduled reception of a physical downlink shared channel (PDSCH) communication satisfying a threshold, and based at least in part on a rule that is associated with how the DCI is received, a transmission configuration indicator (TCI) state, wherein the rule specifies that if the scheduling offset satisfies the threshold, the UE is to select an indicated TCI state used for UE-dedicated reception; and receiving the PDSCH communication with the TCI state.

28. The method of claim 27, wherein the rule specifies that if the scheduling offset satisfies the threshold;

if the indicated TCI state used for UE-dedicated reception and a TCI state of a control resource set that includes the DCI are different, and if the DCI has a TCI field that is used for UE-dedicated TCI indications, the UE is to select a TCI state indicated by the TCI field in the DCI.

29. The method of claim 27, wherein the rule specifies that if the scheduling offset satisfies the threshold, the UE is to select the TCI state of a beam used for receiving the DCI if the DCI has no TCI field.

30. The method of claim 27, wherein the rule specifies that if the scheduling offset satisfies the threshold, if the indicated TCI state used for the UE-dedicated reception and a TCI state of a control resource set that includes the DCI are different, and if the DCI has a TCI field that is used for UE-dedicated TCI indications, the UE is to ignore a TCI field in the DCI.

* * * * *